United States Patent

[11] 3,574,262

| [72] | Inventor | John Kent Bowker |
| | | Marblehead, Mass. |
| [21] | Appl. No. | 641,329 |
| [22] | Filed | May 25, 1967 |
| [45] | Patented | Apr. 13, 1971 |
| [73] | Assignee | Itek Corporation |
| | | Lexington, Mass. |

[54] CINEMATOGRAPHIC APPARATUS
40 Claims, 28 Drawing Figs.

[52] U.S. Cl. ............................................. 35/12,
352/81, 352/82, 352/83, 352/85, 352/133, 352/236
[51] Int. Cl. ............................................. G03b 19/18
[50] Field of Search ............................................. 352/82, 83, 91, 96, 81, 133, 104, 69, 129, 70, 85, 93, 236, 239; 35/12 (N), 12 (W)

[56] References Cited
UNITED STATES PATENTS

| 1,762,378 | 6/1930 | Avers | 352/82 |
| 2,086,182 | 7/1937 | Dvornik | 352/67 |
| 2,167,107 | 7/1939 | Dvornik | 352/81 |
| 2,929,305 | 3/1960 | Blackstone | 352/60 OX |
| 3,026,633 | 3/1962 | Browne | 352/39 OX |
| 3,038,370 | 6/1962 | Nakamatsu | 352/70 |
| 3,136,208 | 6/1964 | Magson | 352/93 OX |
| 3,291,555 | 12/1966 | Browning | 352/84 OX |
| 1,815,455 | 7/1931 | Waller | 352/46 |
| 1,917,611 | 7/1933 | Starr | 35/12(UX) |
| 2,374,401 | 4/1945 | White | 35/12(N) |
| 2,385,095 | 9/1945 | McCarthy | 35/12(W) |
| 3,089,256 | 5/1963 | Long | 35/12(N) |
| 3,367,046 | 2/1968 | Neuberger | 35/12(N) |

*Primary Examiner*—Samuel S. Matthews
*Assistant Examiner*—Monroe H. Hayes
*Attorneys*—Homer O. Blair, Robert L. Nathans and John E. Toupal

ABSTRACT: A method and apparatus for simulating flight along a random path toward a given point. Several sequences of motion pictures are taken during approaches along closely spaced known paths toward the given point. A plurality of projectors and control apparatus are provided for projecting onto a display area a sequence of interspersed individual pictures from the plurality of motion picture sequences. The individual picture projected at each instant represents the picture which most closely corresponds with the picture that would be taken from a point simulated by the controls of the flight-simulating apparatus at that instant.

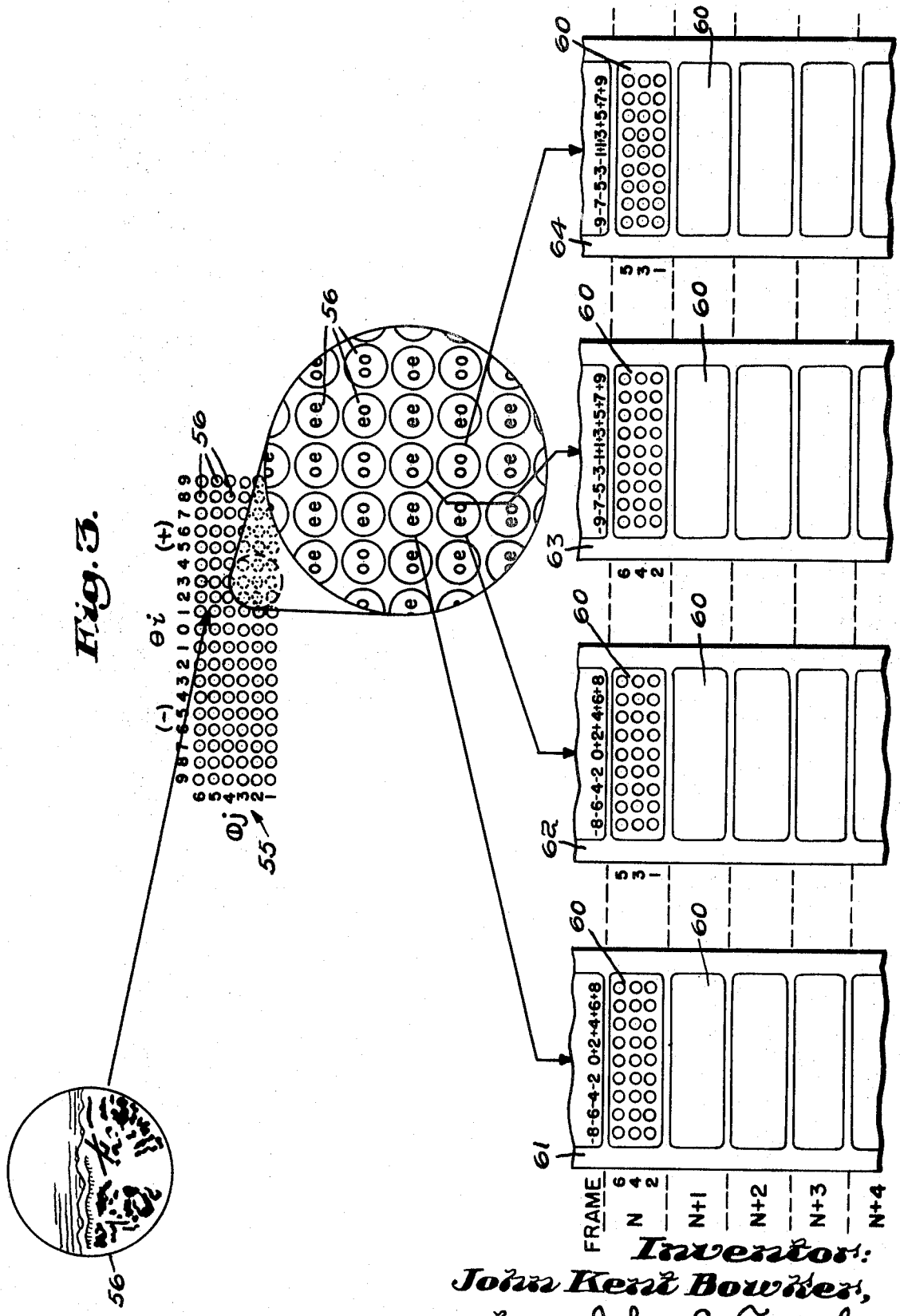

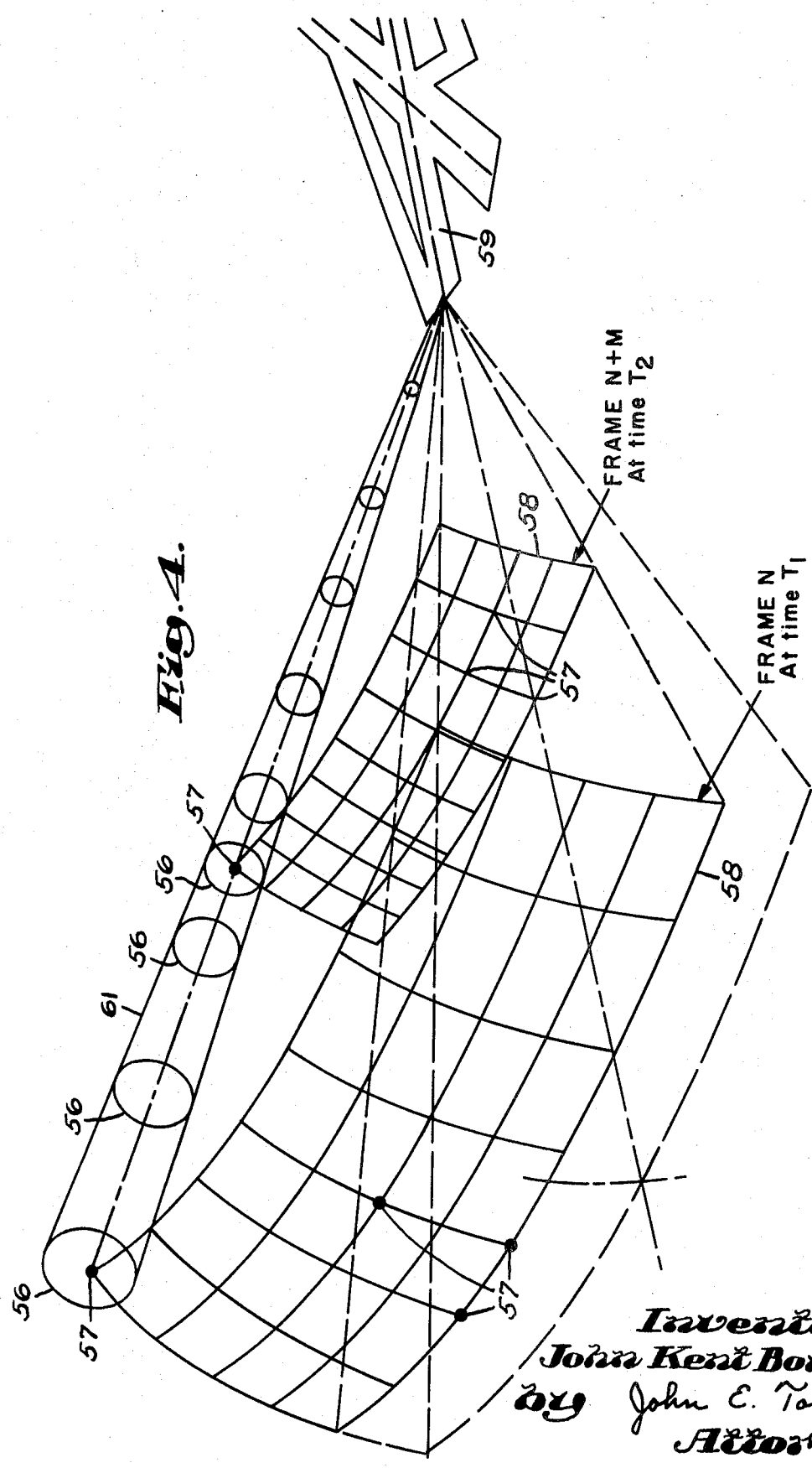

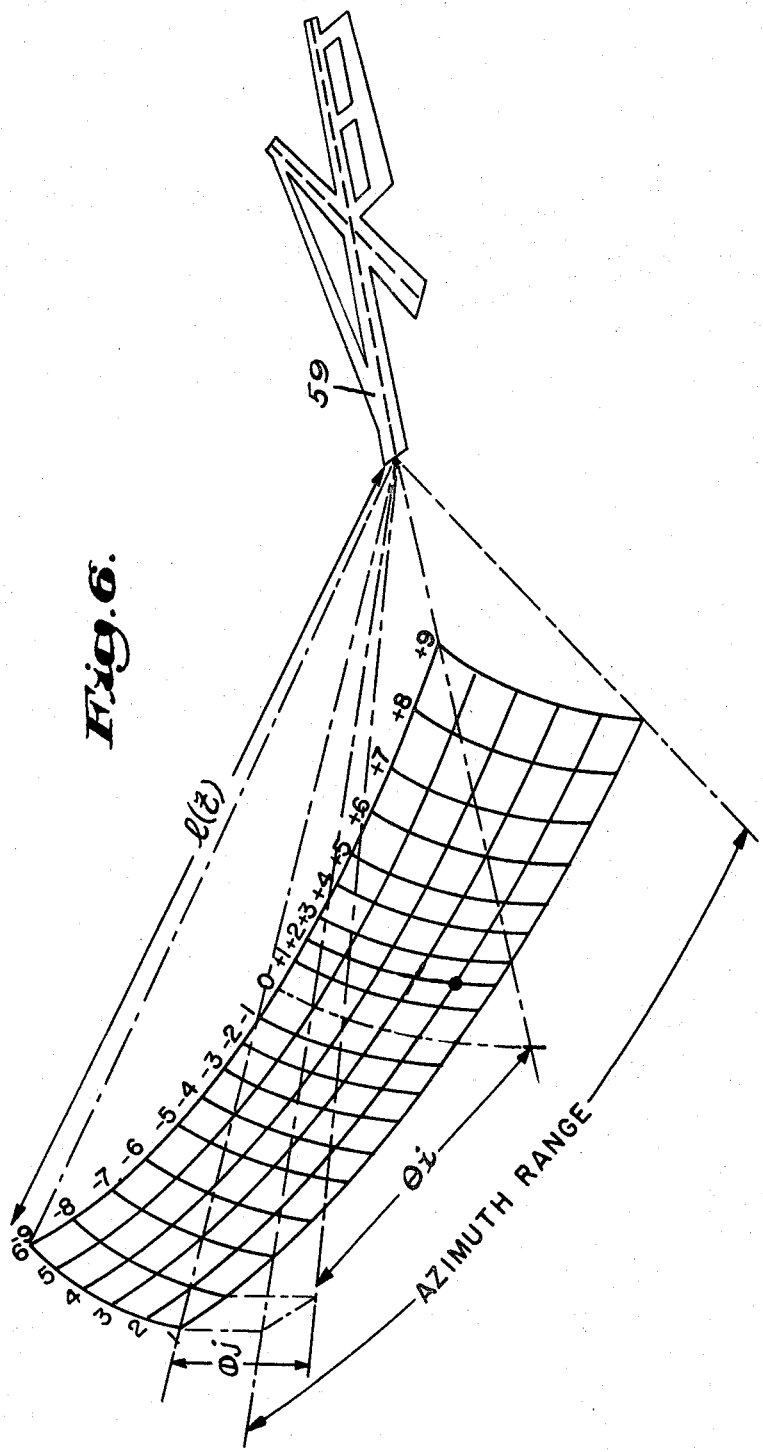

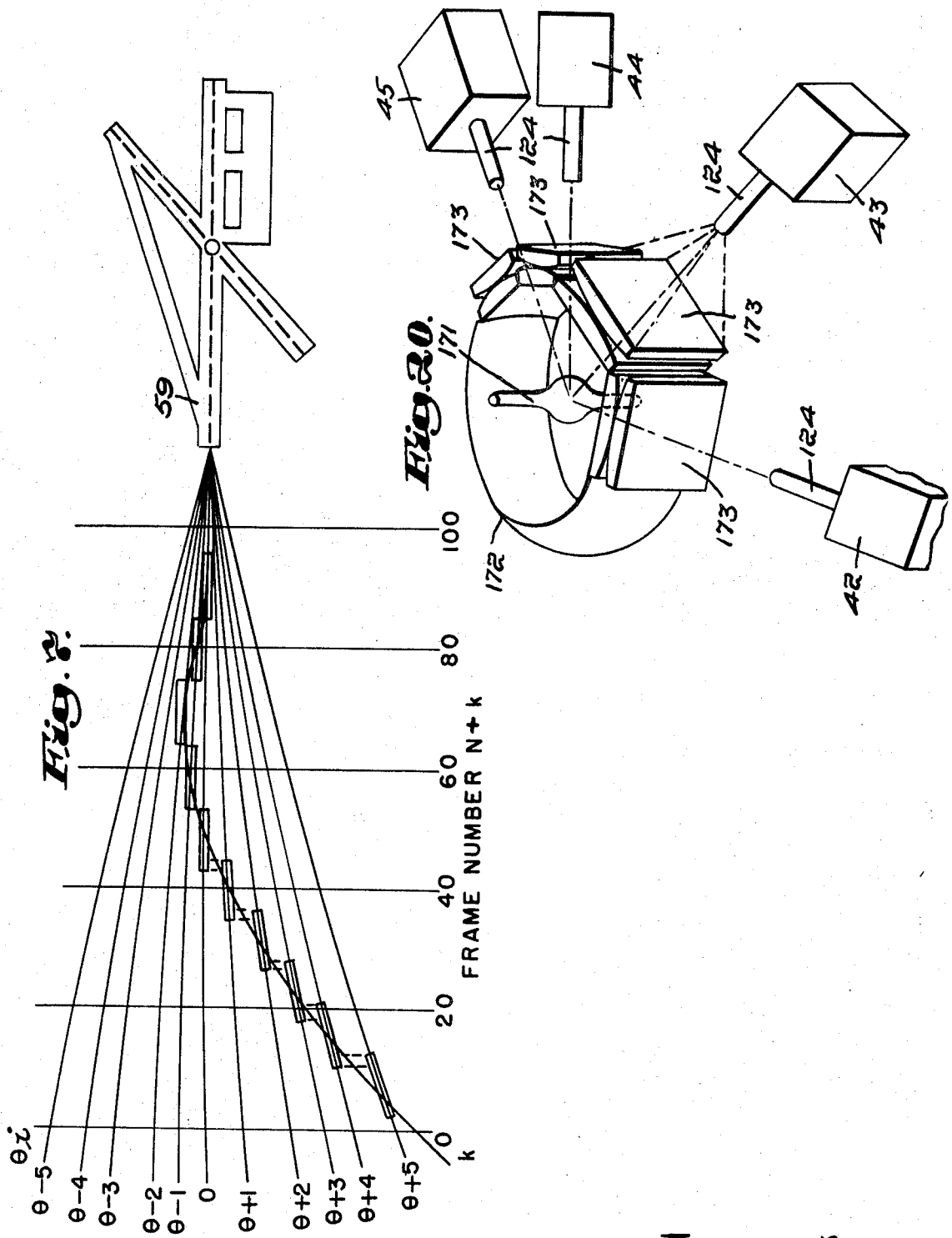

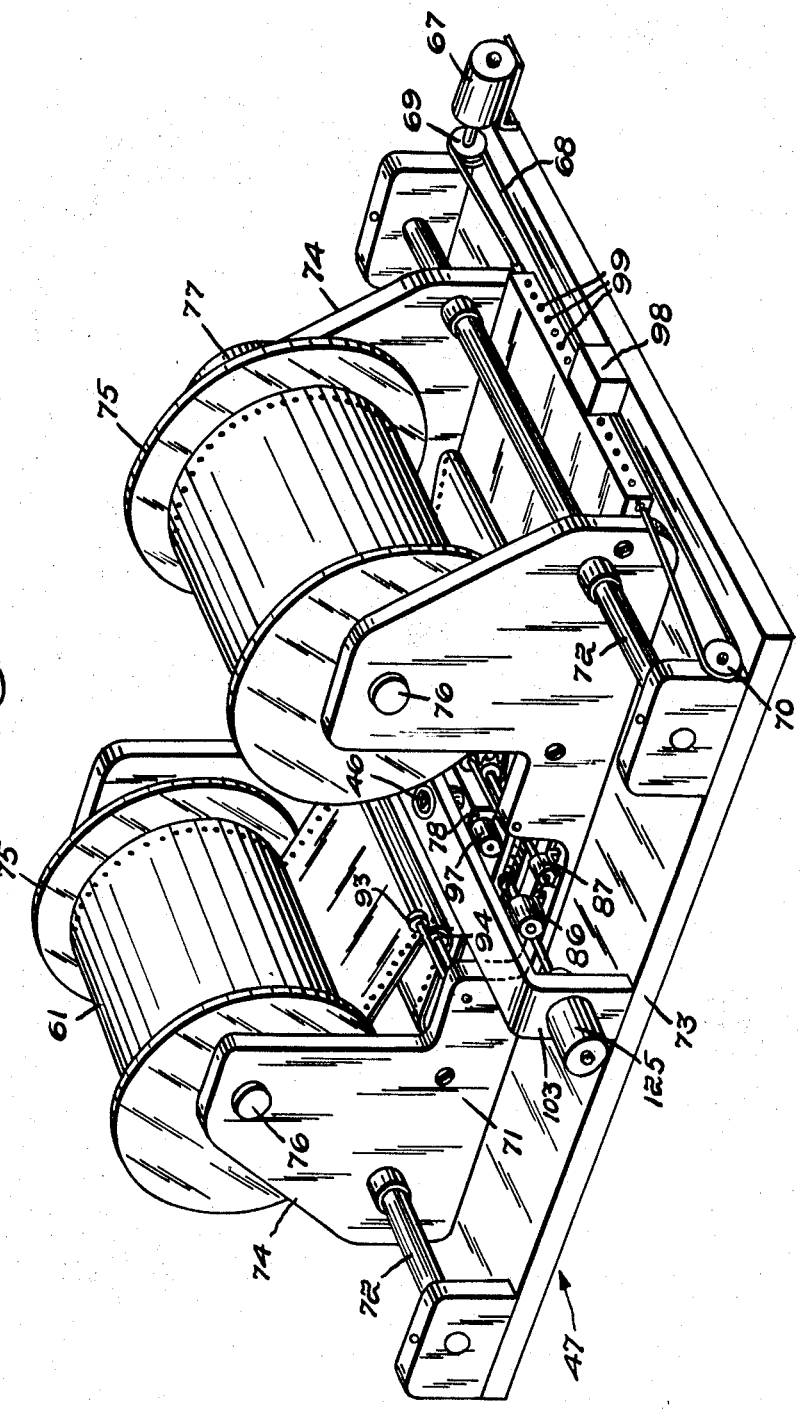

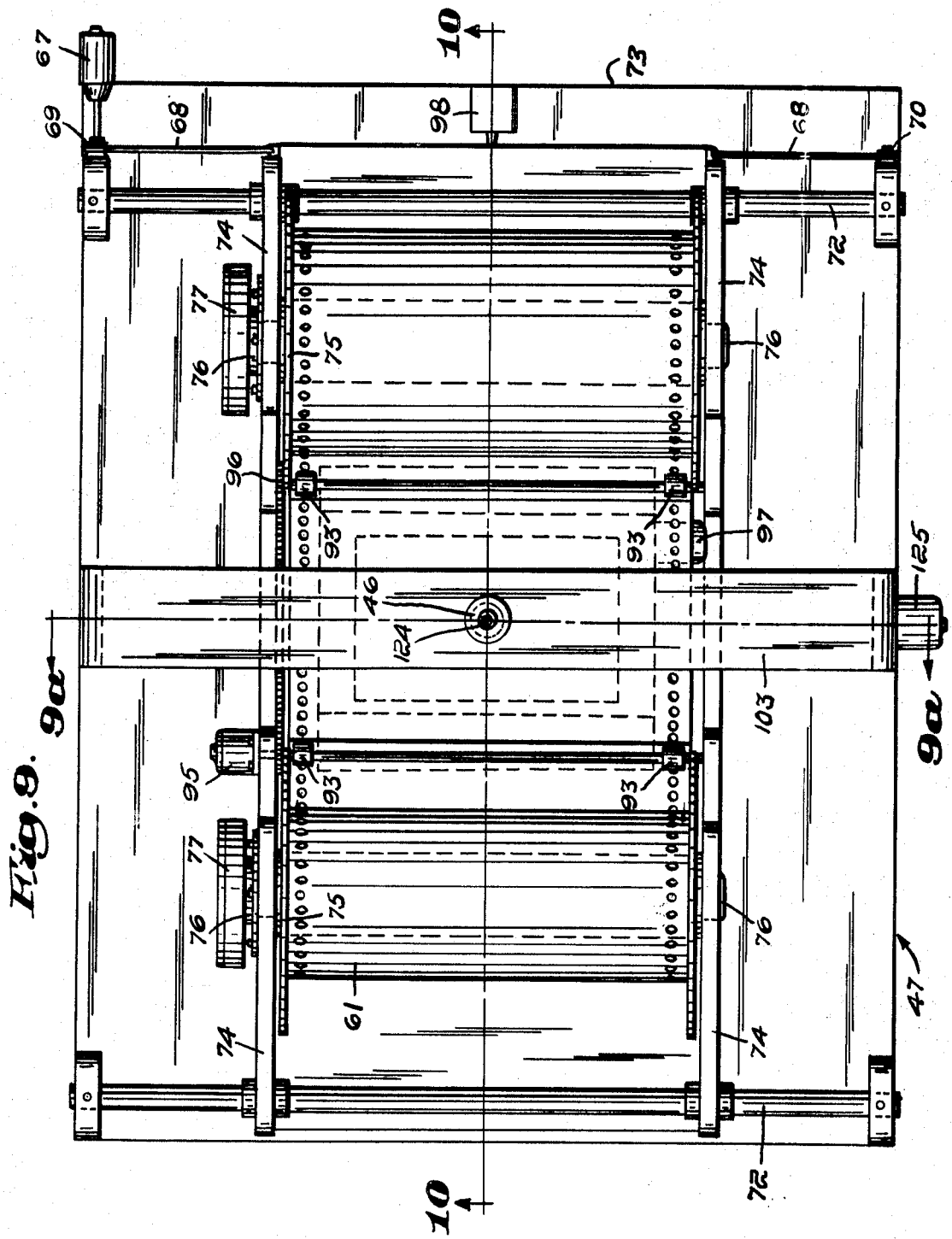

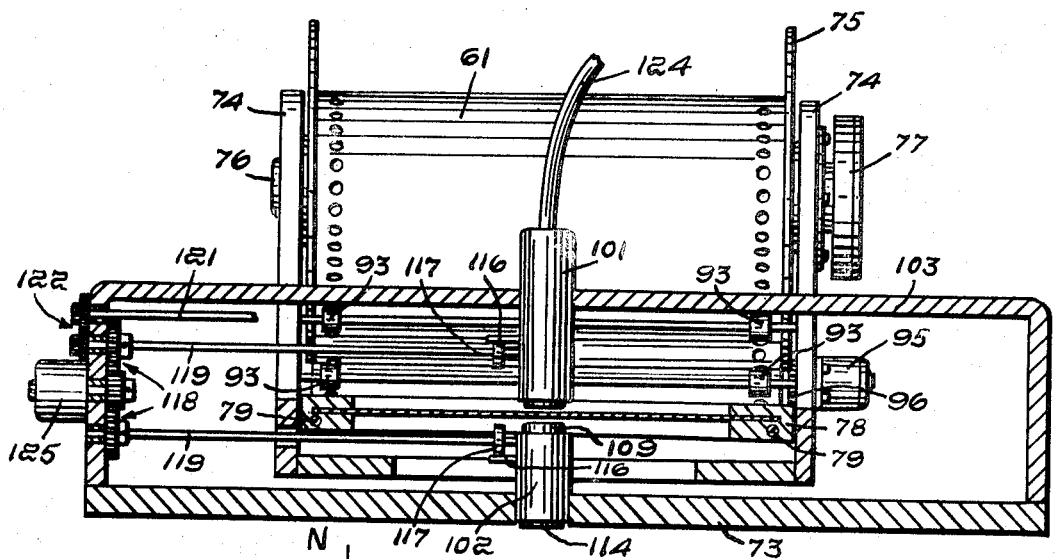

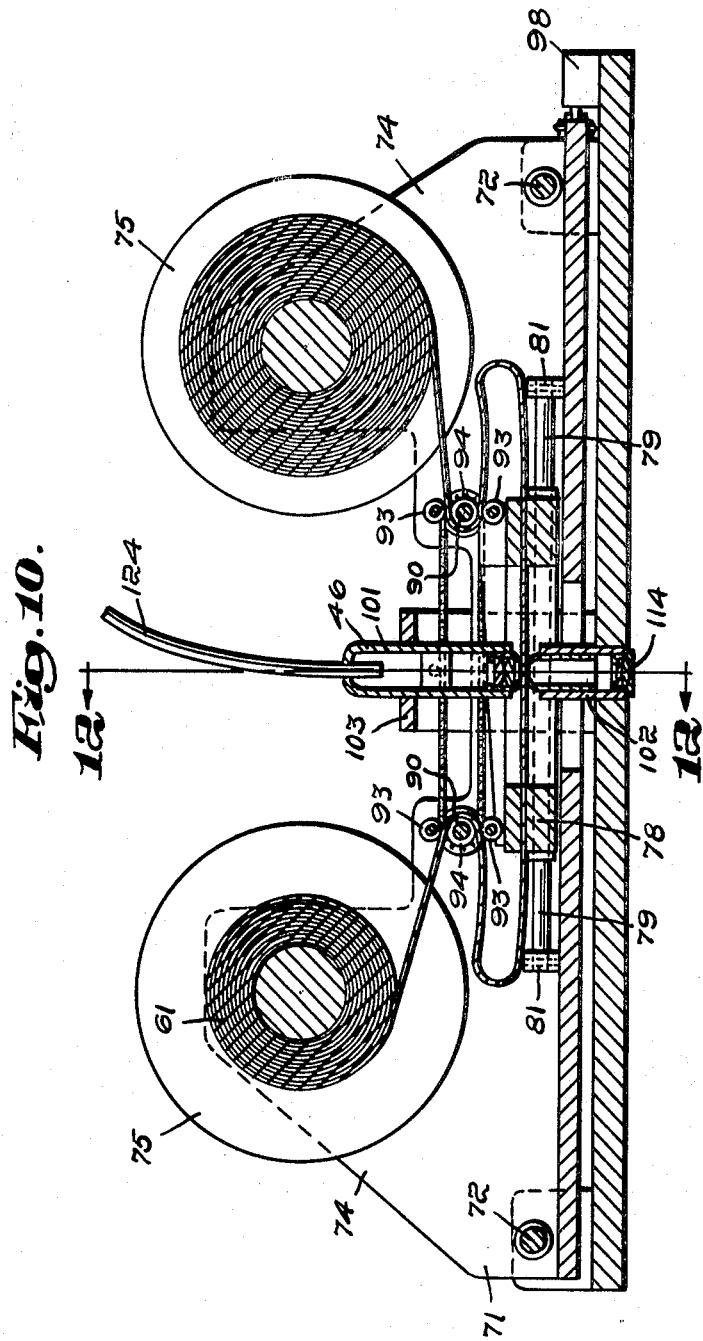

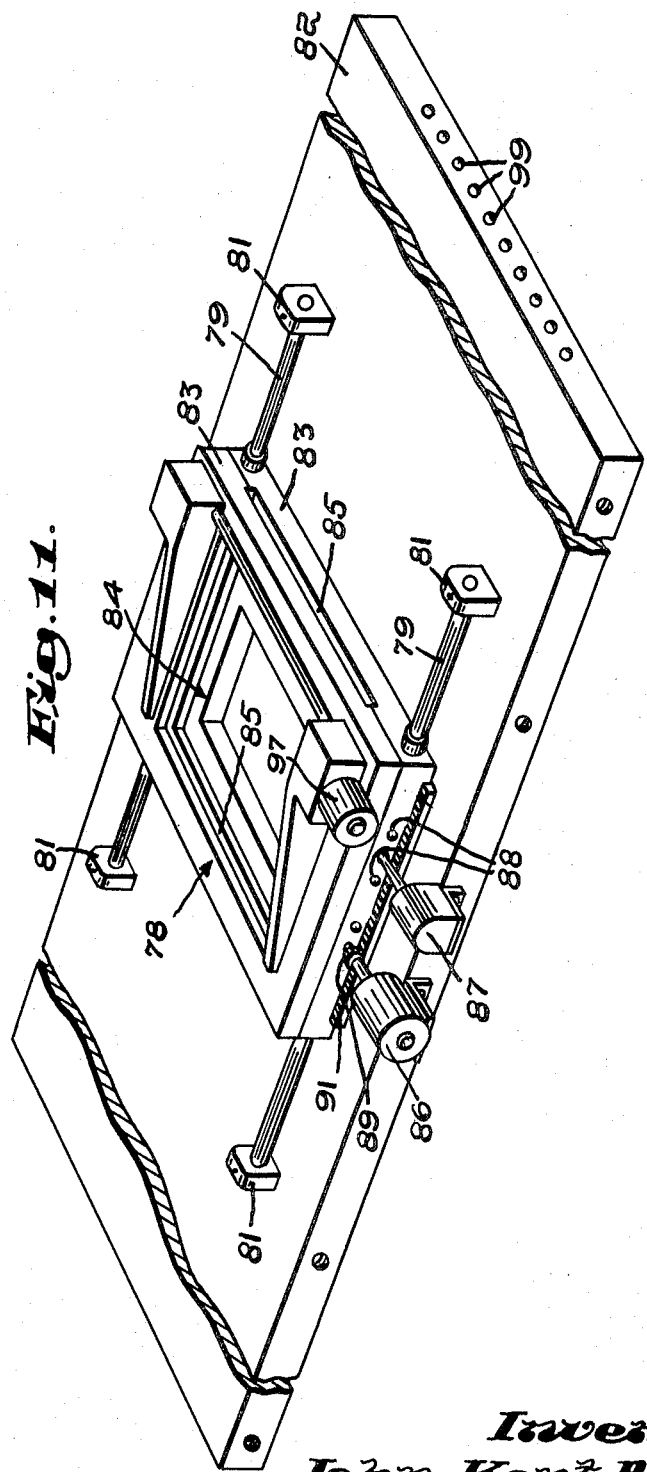

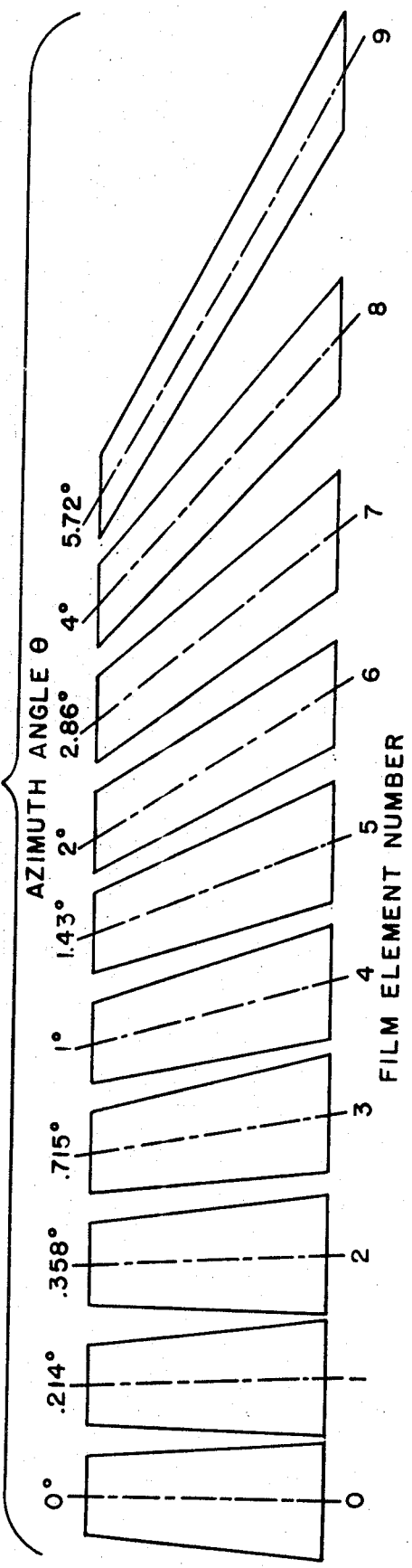
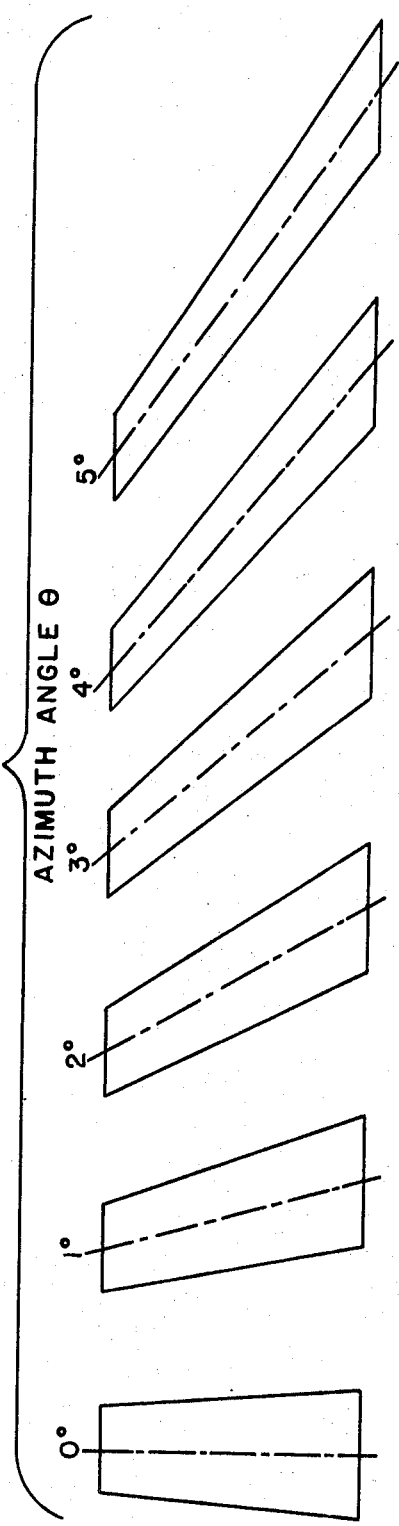
Fig. 14.
Fig. 13.

Inventor:
John Kent Bowker,
by John E. Toupal
Attorney

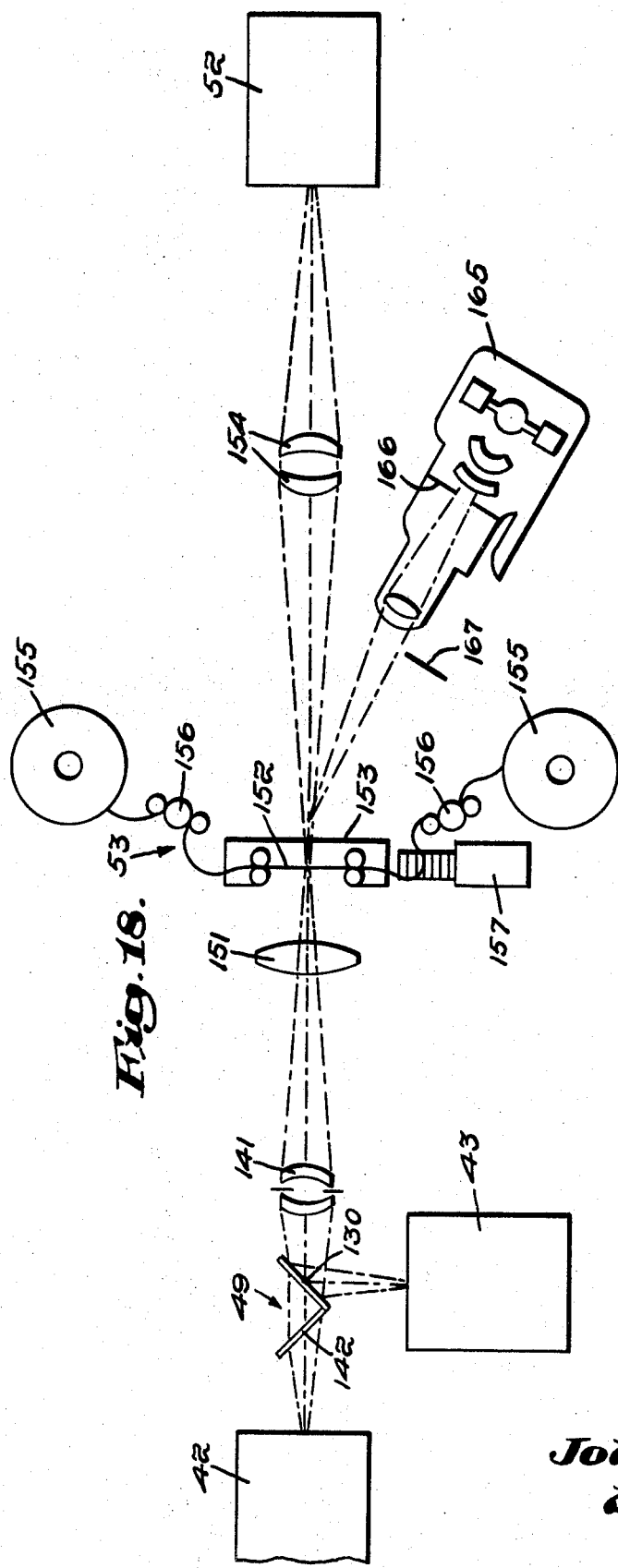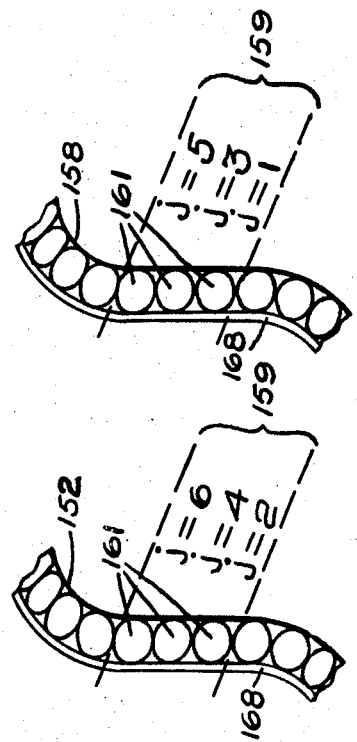

Inventor:
John Kent Bowker,
by John E. Toupal
Attorney

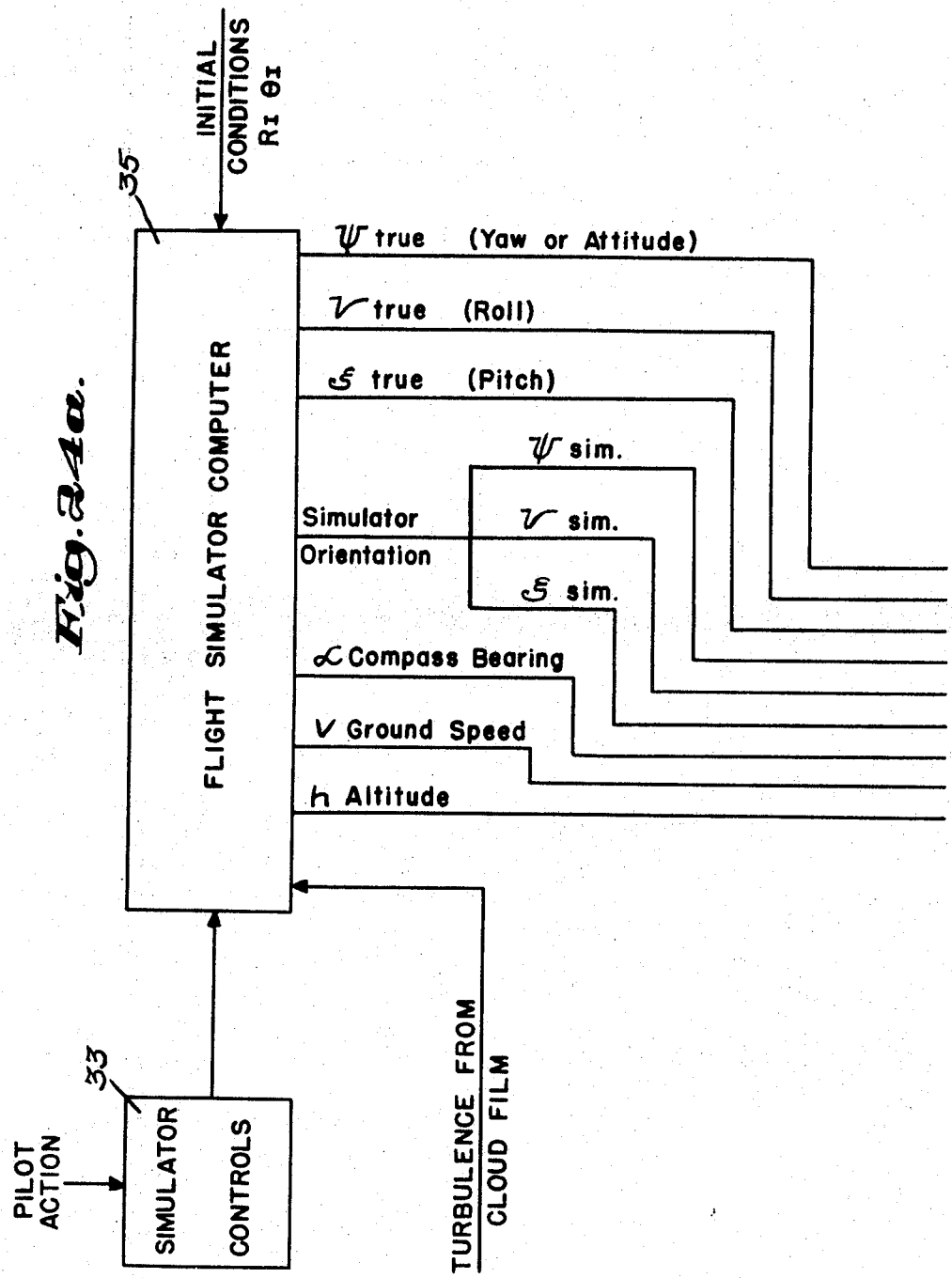

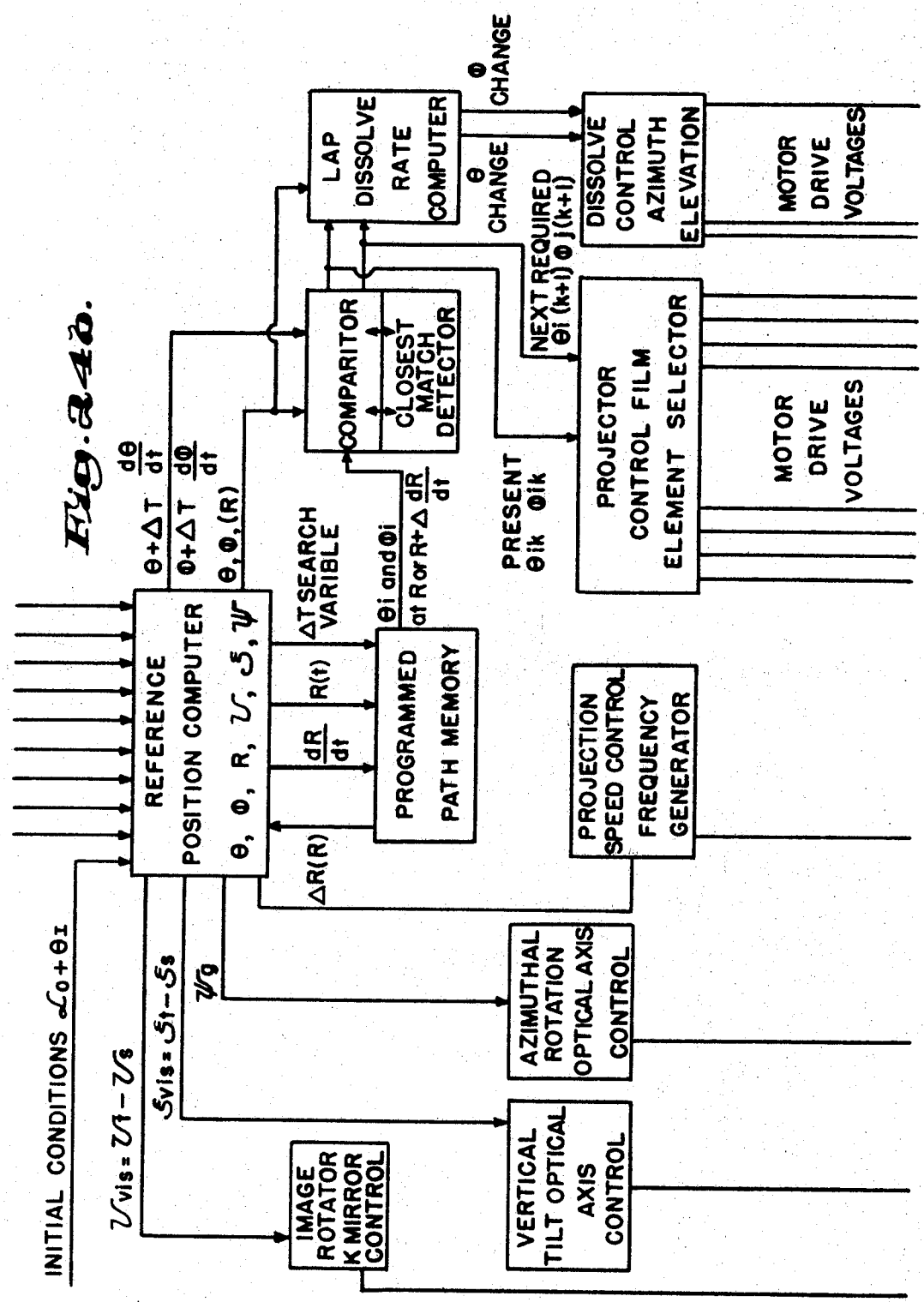

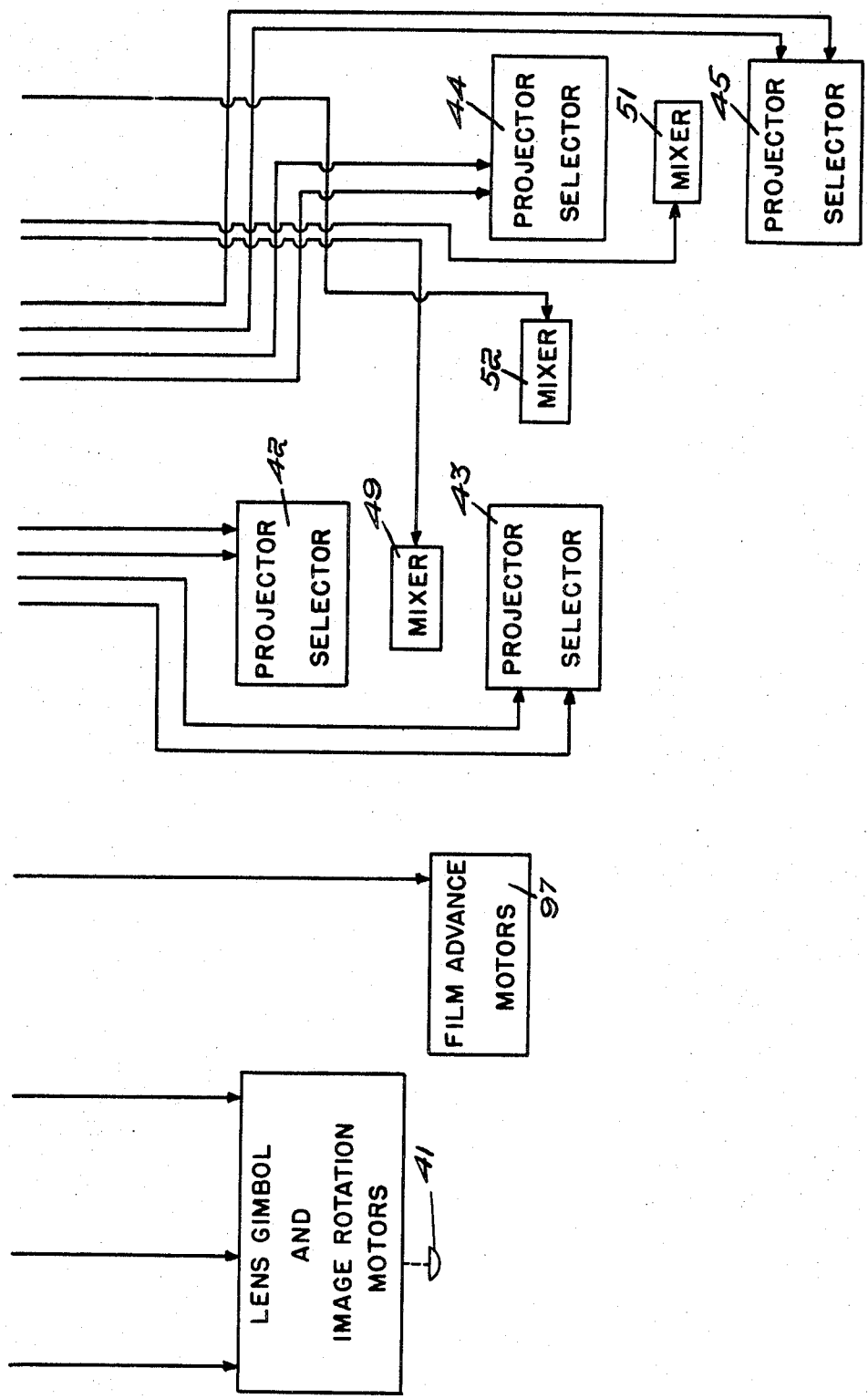

CINEMATOGRAPHIC APPARATUS

This invention relates generally to cinematographic apparatus for selectively providing multiple viewpoints of a given scene and, more particularly, relates to such an apparatus for providing a pilot trainee with a realistic visual display of an approaching landing surface.

With the ever increasing equipment, operating and maintenance costs required for modern jet aircraft, the need for effective pilot training simulator equipment equipped with visual displays has also steadily risen. Many different types of equipment have been suggested and developed in attempts to satisfy this need. However, all prior efforts have failed to produce suitable visual simulation equipment because of many inherent problems which have prevented attainment of the necessary high degree of visual realism.

One prior general approach has utilized some type of programmed visual display of a particular landing scene. The most simple approach entails the use of a single motion picture filmstrip retaining the visual display of a landing scene observed from an aircraft during a given landing approach. Each frame of the film shows the view which is present at a fixed distance from the field at a given altitude and azimuth. Since the aircraft is in motion, the distance changes in time and the simple movie film of an approach is merely a set of photographs taken at more or less uniformly spaced intervals along the given path. The illusion of motion is created when these photographs are projected in sequence at a rapid rate. Variations in velocity can be simulated by modifying the projection rate and changes in yaw and pitch can be simulated by appropriate movement of either the projector or the cockpit simulator itself. However, other changes such as azimuth or altitude deviations from the given flight path cannot be simulated so that relief objects in the scene, their shadows, respective proportions and positions do not change in appearance from those photographed during the given landing approach. Thus, this programmed-type of presentation does not provide a unique scene viewpoint for each and every possible position which an aircraft may assume in space relative to the given landing surface. For this reason, programmed displays are of limited value for testing and perfecting the judgment and reaction of prospective pilots to the great variety of conditions which can be expected during actual flight operations.

Efforts to alleviate the basic limitations of programmed systems have included attempts to increase the quantity of information retained by the filmstrips. For example, possessing motion pictures taken along adjacent flight paths, one can, by simultaneously transporting both films, selectively project the images retained on one film or the other according to a desired motion of the simulated aircraft. Such an arrangement permits some limited amount of freedom for changes in lateral or vertical motion. However, with all such previous systems, the physical problems associated with storing and appropriately selecting individual data from any reasonably extensive quantity of information have prevented effective use of programmed systems. Another substantial problem in these systems is the lack of realism caused by noticeable jumps of the observed scene when shifts from one set of data to another occur.

Another programmed presentation approach uses a movie projector system with an anamorphic projection lens which distorts the geometry of the photographed scene to create the illusion of a change of viewpoint. Typically, a motion picture is made from an aircraft flying a reference flight path and then, by introducing controlled amounts of distortion of the projected pictures in accordance with deviations of a simulated flight from the reference flight path, one observes scenes which resemble aspects displaced from the original reference aspects. The primary objection to these systems is that displaced viewpoints obtained at the cost of extreme and unrealistic distortions in the vertical elements of the scene. For example, producing even relatively small viewpoint changes can create the visual impression that vertical objects such as buildings and trees have actually toppled over.

In addition to programmed display systems, various analogue-type visual simulator systems have been developed and proposed. Typically, analogue systems utilize live television systems which simultaneously scan and reproduce upon a screen the scenes presented by a representative model. The images viewed on the screen bear that viewpoint of the model which an observer would have if located at the position of the television camera. Since the camera itself can normally be moved in any direction relative to the model, a completely unprogrammed display is possible. However, the analogue systems also suffer from inherent characteristics which prevent the attainment of fully satisfactory results.

One principal disadvantage of the analogue systems stems from the requirement for prepared models to depict a desired surface scene. Because of this requirement, analogue proponents are faced with the conflicting objective of practical cost and acceptable realism, for to improve the degree of realism the model scale ratio must be enlarged which in turn increases costs of model construction, use, storage and maintenance. Conversely, in relatively inexpensive models of small scale, the relief components are unnatural and fragile. Because of these problems and the basic weaknesses of television reproduction, the scenes presented by existing analogue systems uniformly present a display with very poor resolution, low light level and an unacceptable degree of reality.

U.S. Pat. No. 3,114,979 describes another flight simulation system having a stated objective of reducing the problems associated with analogue systems. According to this system, separate sections of an original model are exposed upon individual photographic plates which cumulatively retain the entire scene depicted by the model. Each of the plates includes a plurality of separate, closely adjacent storage elements which are originally sensitized and then exposed to incrementally different aspects of the particular section of the model with which the plate is associated. Thereafter, when illuminated, each storage element yields rays which are focused toward their original orientation in space relative to the plates, and there they constitute an image which resembles the original model. By selecting and projecting onto a screen the rays from certain selected groups of the storage elements one obtains an aspect of the original model which was originally viewed by the selected element group.

Although purportedly alleviating some of the problems related to storage and maintenance of scenic models, the system described in the above patent does not eliminate the basic deficiency of the analogue system i.e. the lack of acceptable realism inherent in the use of models. Furthermore, the perpendicular viewpoints provided are not consistent with the oblique viewpoints normally viewed by pilots during a landing approach in a typical aircraft wherein the lines of sight are forward and intersect the earth's surface at a relatively small angle.

The primary object of this invention, therefore, is to provide in a cinematographic display selectively variable, unprogrammed viewpoints of a given scene.

A further object of this invention is to provide such a cinematographic display which reproduces a particular portion of the earth's surface, preferably including an actual aircraft landing surface, and wherein the selectable viewpoints vary relative to the landing surface in azimuth angle, altitude and range.

One feature of this invention is the provision of a cinematographic film having a plurality of film frames each composed by a plurality of discrete film elements. The film elements in each film frame retain photographic images of different aspects of the same scene as viewed from a substantially constant range which decreases in successive film frames. By selecting for projection a particular film element in each film frame, one is able to obtain variable viewpoint cinematographic displays of an approaching scene.

Another feature of this invention is the provision of a cinematographic film of the above-featured type wherein the photographically retained scene includes an aircraft landing surface thereby rendering the film useful for flight simulation pilot training.

Another feature of this invention is the provision of a cinematographic film of above-featured types wherein the individual film elements retain images of the landing surface as viewed from different aspect positions above the landing surface along lines of sight which are acute thereto. The oblique viewpoints images simulate the actual viewpoints existing in an actual aircraft which normally approaches the landing surface at a small angle to that surface.

Another feature of this invention is the provision of a cinematographic film of the above-featured types wherein the film elements retain photographic images of an actual landing surface as viewed from substantially spaced apart aspect positions. By providing images in each film frame of substantially spaced aspect positions one is able to reproduce with a finite number of film elements, a cinematographic display of the landing surface as viewed along substantially different landing approach paths.

Another feature of this invention is the provision of a cinematographic film of the above-featured types wherein the plurality of film frames are serially joined to form an elongated film strip thereby permitting the separate frames to be rapidly and efficiently transported through a cinematograph.

Another feature of this invention is the provision of a cinematographic film of the above featured types wherein the individual film elements are spaced apart and distributed transversely and longitudinally on the filmstrip so as to provide a compact, easily handled matrix of retained images in each frame of the film strip.

Another feature of this invention is the provision of a cinematographic film of the above-featured types wherein film elements retaining images of different horizontal aspect are transversely spaced on the filmstrip and film elements retaining images of different vertical aspect are longitudinally spaced on the filmstrip. In normal application, it is desireable to provide with the cinematographic film a larger variety of horizontal aspects than of vertical aspects. For this reason, a filmstrip produced with this disposition of film elements in each frame is more suited for rapid sequential movement through the cinematograph.

Another feature of this invention is the provision of a cinematographic device including a cinematographic film having a plurality of film frames each composed by a plurality of discrete film elements and a cinematograph adapted to sequentially and selectively project the images retained by only predetermined particular film elements in each film frame. The individual film element in each film frame retains photographic images of the same scene as viewed from different oblique aspect positions at a substantially constant range which decreases in successive film frames.

Another feature of this invention is the provision of a cinematographic device of the above-featured type wherein the surface scene includes an aircraft landing surface and the images retained by each set of identically located film elements in successive film frames forms a cinematographic record of a given landing approach path to the landing surface. The plurality of landing approach paths recorded by all sets of identically located film elements form an envelope of the practically available approach paths converging at the landing surface.

Another feature of this invention is the provision of a cinematographic device of the above-featured types wherein film elements in each film frame retain images of the landing surface as viewed from different aspect positions substantially equidistant from the landing surface and spaced substantially apart. The substantial spacing between different aspect positions permits selection and display of viewpoints for any feasible landing approach path with a finite number of individual film elements in each film frame.

Another feature of this invention is the provision of a cinematographic device of the above-featured types including an aircraft cockpit simulator, manually operable aircraft controls within the cockpit simulator, a photographic screen positioned so as to be visible from the cockpit simulator and so as to receive images projected by the cinematograph, and feedback control equipment adapted to control the selection of images projected by the cinematograph in response to operation of the aircraft controls. This arrangement provides the combination of elements necessary to completely simulate for a pilot trainee the conditions existing in an airborne craft.

Another feature of this invention is the provision of a cinematographic device of the above-featured type including a plurality of selectors responsive to the feedback control equipment and adapted to independently select in each film frame a plurality of film elements for projection of the images retained thereon. By providing separate and independent selectors, the cinematograph is able to select in advance a film element retaining a viewpoint in a predicted new flight path while a viewpoint in a current flight path is being displayed on the photographic screen.

Another feature of this invention is the provision of a cinematographic device of the above-featured types wherein film elements retaining scene images a viewed from directly adjacent aspect positions are separated in each of the separate film frames by other film elements. By separating film elements retaining directly adjacent aspect positions, there is obtained a simplification of the optical problems associated with selecting and preparing for projection of a film element representing a predicted flight path change while actually projecting the image on a film element representing an adjacent flight path.

Another feature of this invention is the provision of a cinematographic device of the above-featured types wherein the cinematograph includes an optical relay mechanism adapted to relay the projected images selected by each of the selectors to a common projection lens for ultimate projection on the photographic screen. This arrangement simplifies the overall optical system and facilitates the combination of a plurality of separate images for simultaneous projection upon the photographic screen.

Another feature of this invention is the provision of a cinematographic device of the above-featured types wherein the optical relay mechanism is responsive to the feedback control equipment to transiently relay to the common projection lens the images selected by two of the separate selectors when a newly selected film element retains an image for an approach path other than that represented on the previously selected film element. Transiently combining the different images produces a lap dissolve wherein one image is gradually supplanted by the next and wherein the view displayed at the midpoint of the dissolve is the average of the two images thereby effectively smoothing the transition.

Another feature of this invention is the provision of a cinematographic device of the above-featured types wherein each of the film frames is divided into a plurality of separate film frame sections and the separate film frame sections of successive film frames are serially joined to form a plurality of separate filmstrips. Positioning film elements representing different, directly adjacent flight paths in completely separate film strips facilitates the ease with which viewpoints in adjacent flight paths can be independently selected, substituted for each other or combined in a lap dissolve.

Another feature of this invention is the provision of a cinematographic device of the above-featured types wherein the different aspect positions represented in each film frame are uniformly selected so as to include a plurality of different horizontal aspect positions at each different vertical aspect position, the various different vertical aspect positions are given alternating even and odd designations and the various different horizontal positions also are given alternating even and odd designations. The film elements retaining images of aspect positions having even vertical and even horizontal designations are located in a first filmstrip, the film elements retaining images of aspect positions having odd vertical and even horizontal designations are located in a second filmstrip, the film elements retaining images of aspect positions having even vertical and odd horizontal designations are located in a third filmstrip, the film elements retaining images of aspect positions having odd vertical and odd horizontal designations are located in a fourth filmstrip, and four separate selectors are provided which can simultaneously select for projection in each film frame the images retained by at least one film element in each of the first, second, third and fourth filmstrips. With this arrangement of film elements in the various filmstrips, the film elements of each film frame retaining images of the eight aspect positions surrounding any given aspect position will be located in filmstrips other than that having the film element which retains the image of the given aspect position. Thus, upon any possible shift from an approach path represented in one filmstrip to some adjacent approach path, the film elements representing the new path will be located in a different filmstrip. This greatly simplifies both the preselection of film elements representing a predicted approach path deviation and the transient combination in a lap dissolve of the images retained by elements representing both the current and the predicted new approach path.

Another feature of this invention is the provision of a cinematographic device of the above-featured types wherein each of the separate selectors includes a projector unit having a transport carriage which conveys one of the filmstrips through a fixed optical system. Responsive to the feedback equipment, the transport carriage is movable relative to the optical system in a direction transverse to the filmstrip movement thereby permitting the carriage to align the optical system with the film elements located in a particular, selected transverse location in the filmstrip.

Another feature of this invention is the provision of a cinematographic device of the above-featured types wherein each of the projector units includes a film gate selectively movable relative to the optical system in the direction of film strip movement thereby permitting the film gate to align the optical system with film elements located in a particular, selected longitudinal location in the filmstrip.

Another feature of this invention is the provision of a cinematographic device of the above-featured types wherein the optical relay mechanism includes a mixing plate positioned to receive on one surface a projected image selected by one of the separate projector units and on an opposite surface the projected image selected by another of the separate projector units. The mixer plate is composed of light reflective and light transmissive portions separated by a portion which is partially reflective and partially transmissive and is adapted for movement relative to the projected images. After suitable positioning, the mixer plate relays to the common projector lens either one or the other of the projected images, or a superimposed combination of both the images during a lap dissolve.

Another feature of this invention is the provision of a cinematographic device of the above-featured types wherein the optical relay mechanism includes three such mixing plates, a first positioned to receive images selected from the first and third filmstrips, a second positioned to receive the images selected from the second and fourth filmstrips and a third positioned to receive and relay to the common projection lens the images transmitted by the first and second mixing plates. With this optical relay mechanism, one is able to project upon the photographic screen either individually or in any collective combination the images selected from each of the separate filmstrips.

Another feature of this invention is the provision of a cinematographic device of the above-featured types including a cloud imagery retaining cinematographic filmstrip and a film transport mechanism adapted to selectively superimpose the retained cloud imagery on the images relayed from the individual film strips to the common projection lens. This feature permits the selective appearance on the photographic screen of cloud imagery which increases the realism and flexibility attainable with the simulated display.

Another feature of this invention is the provision of a cinematographic device of the above-featured types wherein each film frame of the cloud filmstrip possesses a plurality of discrete could film elements which retain cloud imagery associated with a plurality of different altitudes, and the transport mechanism is adapted to select in each frame one of the cloud film elements for superimposition of its cloud imagery on the image relayed to the common projection lens. With this arrangement, cloud imagery appropriate for a given altitude aspect position can be selected and displayed.

Another feature of this invention is the provision of a cinematographic device of the above-featured types wherein the cloud imagery filmstrip is separated into a first cloud filmstrip possessing cloud film elements associated with one set of different altitudes and a second cloud filmstrip possessing cloud elements associated with a different set of altitudes alternating with those of the first set. The cloud film transport mechanism is adapted to selectively superimpose the cloud imagery from the first cloud filmstrip on the image relayed by the first mixing plate and to superimpose the cloud imagery from the second cloud filmstrip on the image relayed by the second mixing plate. Separation of the cloud imagery into separate filmstrips associated with alternate altitudes simplifies both the preselection of cloud imagery for a predicted altitude change and the combination of cloud imagery associated with adjacent altitude during a transient period of change. Also, since the first mixing plate receives images from film elements representing only even vertical aspect positions and the second mixing plate receives images from film elements representing only odd vertical aspect positions, any altitude deviation in the projected flight path requires that the third mixing plate select for final projection on the photographic screen an image from either the first or second mixing plate which was formerly being rejected. Accordingly, this particular arrangement permits with only two separate cloud filmstrips an appropriate change in superimposed cloud imagery for any altitude deviation in the flight approach path.

Another feature of this invention is the provision of a cinematographic device of the above-featured types wherein the cloud filmstrips possess que strips which record the type of cloud imagery being displayed and provide an indication thereof to the aircraft simulator. Responsive to the indications received from the que strips, the aircraft simulator can be subjected to simulated rough air movements appropriately related to the cloud imagery being displayed.

Another feature of this invention is the provision of a cinematographic device of the above-featured types wherein the common projection lens is a fisheye-type lens and the photographic screen has a spherical form which partially encloses the cockpit simulator. The use of a fisheye lens and a spherical screen greatly increases the realism attainable in the projected display.

Another feature of this invention is the provision of a cinematographic device of the above-featured types wherein the fixed optical system for each separate projector unit includes a light pipe light source and wherein the light pipes for all projector units are illuminated by a common light source. This feature prevents a change in the light intensity of the photographic display during switching between the separate film strips.

These and other objects and features of this present invention will become more apparent upon a perusal of the following specification taken in conjunction with the accompanying drawings wherein:

FIG. 3 is a schematic view (including blown-up portions) of the cinematographic film used with the apparatus of FIG. 2;

FIG. 4 is a geometrical diagram illustrating the various distinct viewpoints retained by each frame of the cinematographic film shown in FIG. 3;

FIG. 6 is a geometrical diagram illustrating the manner in which arbitrary numerical designations are given to film elements located in each frame of the cinematographic film shown in FIG. 3;

FIG. 7 is a geometrical diagram illustrating the manner in which individual film elements in the cinematographic film of FIG. 3 are selectively projected to provide a desired visual approach to the airfield 59;

FIG. 8 is a perspective view of one of the selector projector units shown schematically in FIG. 2;

FIG. 9 is a plan view of the projector unit shown in FIG. 8;

FIG. 9a is a cross-sectional view of the projector unit shown in FIG. 9 taken along lines 9a–9a;

FIG. 10 is a cross-sectional view of the projector unit shown in FIG. 9 taken along lines 10–10;

FIG. 11 is a perspective view of the film gate mechanism used in the projector unit shown in FIGS. 8—10;

FIG. 13 is a schematic illustration of the changes in scene perspective of a landing strip viewed from uniformly spaced azimuth angle viewpoints;

FIG. 14 is a schematic illustration of the changes in scene perspective of a landing strip viewed from logarithmically spaced azimuth angle viewpoint positions;

FIG. 18 is a more detailed schematic view of one of the cloud imagery devices shown in FIG. 2;

FIG. 19 is a schematic view of a cloud imagery retaining filmstrip utilized with only one of the cloud imagery producing devices 53 shown in FIG. 2;

FIG. 19a is a schematic view of a cloud imagery retaining filmstrip utilized with the other cloud imagery producing device shown in FIG. 2;

FIG. 20 is a schematic view of the light source utilized with the optical portions of the projector units shown in FIG. 2;

FIG. 23 is a geometrical diagram illustrating the relationship between a typical flight simulator coordinate system and the coordinate system of film elements retained by the cinematographic film shown in FIG. 3; and FIGS. 24a, 24b and 24c compositely illustrate in schematic form an electrical system for controlling the cinematographic apparatus shown schematically in FIG. 2.

Figure 1:
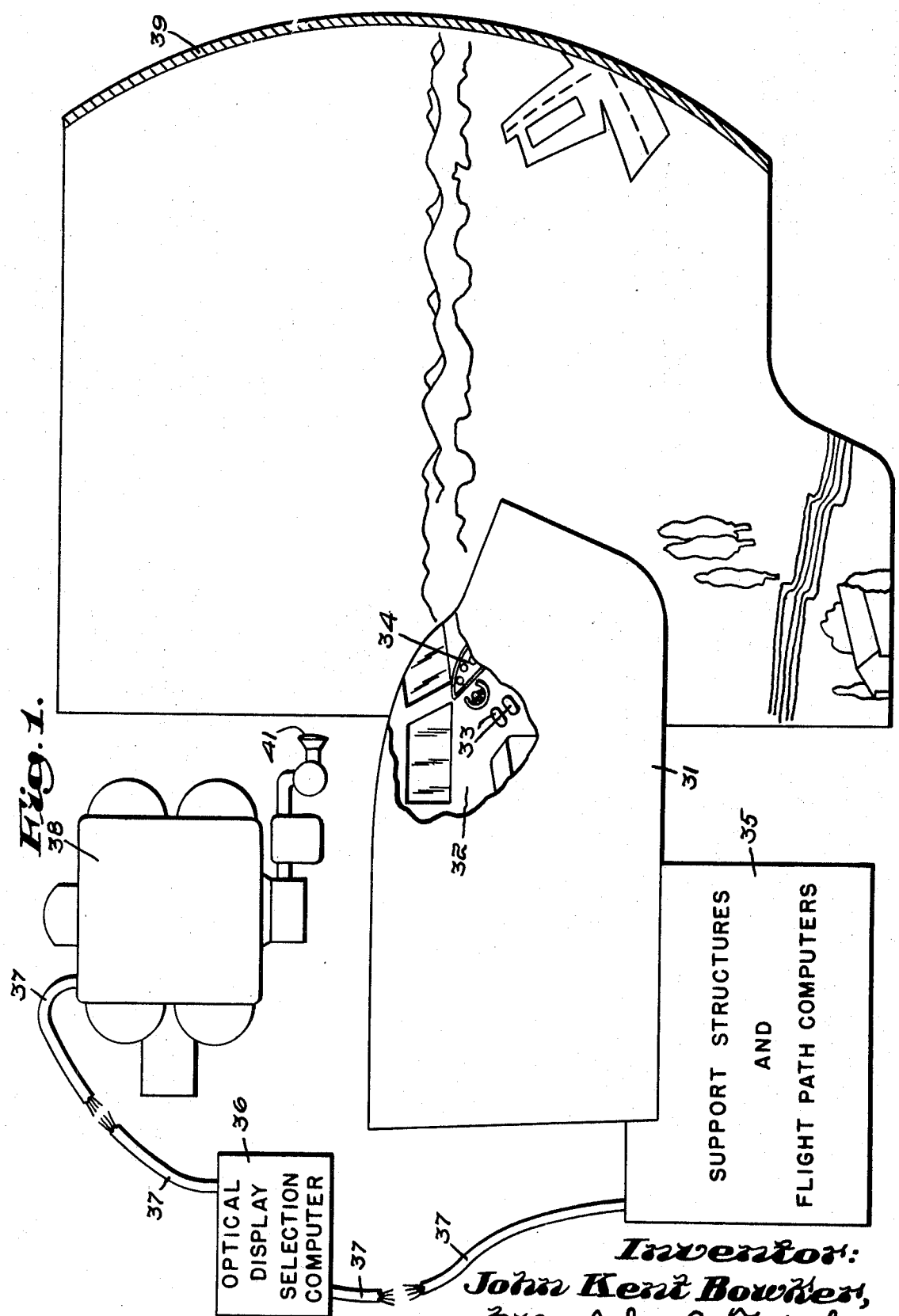
FIG. 1 is a schematic view of a preferred composite apparatus embodying various component parts of the invention.

Referring now to FIG. 1 there is shown the flight simulator 31 enclosing the simulated cockpit 32, aircraft controls 33 and instrument panel 34. Associated with the simulator 31 is the base 35 which encloses simulator support structures (not shown) and a plurality of flight path computers adapted to continuously solve equations of motion of the simulated aircraft 31 in response to both preset input conditions and those provided by manipulation of the controls 33. The flight path computers provide electrical and mechanical outputs which control both simulator movement and the readings on the instruments and indicators in the control panel 34. The construction details of the aircraft simulator 31, the simulator support structures and the flight computer equipment, per se, do not form a part of the invention and such details are generally well known and available in the prior art. Descriptions of aircraft simulators and associated flight computers appear, for example, in U.S. Pat. Nos. 2,591,752 and 2,961,778.

Positioned above the aircraft simulator 31 and coupled to the flight path computers by the electrical leads 37 and the optical display selection computer 36 is the cinematograph device 38. Partially enclosing the aircraft simulator 31 is the spherically-shaped high gain photographic screen 39 which is visible to a pilot trainee (not shown) seated in the cockpit 32 and displays the images projected by the fisheye projection lens 41 of the cinematographic device 38. So as to provide a display which approaches daylight brightness conditions, the pilot trainee preferably is positioned at approximately the focus of the lens 41 which is formed by the high gain spherical screen 39.

Figure 2:
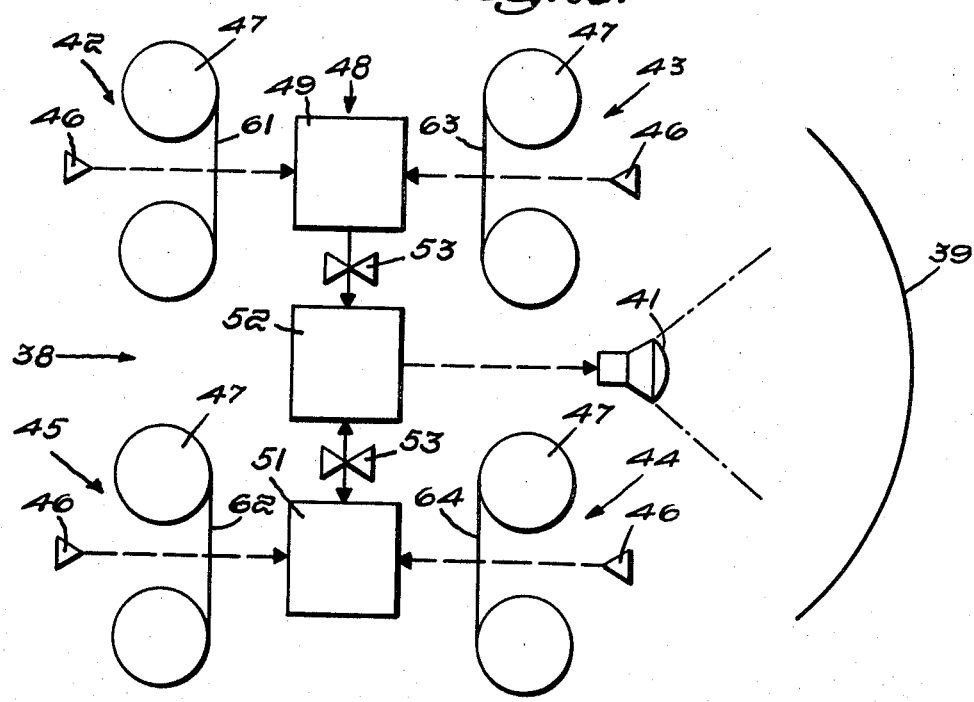
FIG. 2 is a schematic view of the cinematographic apparatus 38 shown in FIG. 1.

As shown schematically in FIG. 2, the cinematograph 38 includes selector projector units 42, 43, 44 and 45 each of which includes an optical system 46 and a film transport mechanism 47. The optical relay system 48 is adapted to relay photographic images from each of the projector units 42, 43, 44 and 45 to the common projector lens 41. Included within the relay system 48 are the first optical mixer 49 which receives images from projector units 42 and 43, the second optical mixer 51 which receives images from projection units 44 and 45 and the third optical mixer 52 which receives photographic images from the first and second optical mixers 49 and 51. Located in the optical paths between the first and third optical mixers 49 and 52 and between the second and third optical mixers 51 and 52 are the cloud imagery producing devices 53. These various components of the cinematograph 38 will be described in greater detail below.

A preferred cinematographic film for use as a visual data recording with the cinematograph 38 is shown in FIG. 3. The film comprises a large number of film frame segments 55 each composed of a plurality of discrete, uniformly distributed film elements 56. The film elements 56 located in each film frame 55 retain photographic images of the same scene viewed from different vertical and horizontal aspect positions relative to that scene. In a preferred embodiment, the film elements 56 in each film frame 55 retain photographic images of the same scene of the earth's horizon as viewed from equidistant positions of different azimuth angle and elevation relative to an aircraft landing surface included in the scene.

As schematically illustrated in FIG. 4, the various viewpoint positions 57 represented in each film frame form a mosaic 58 of positions obliquely and equally spaced from the landing surface 59. The spatial areas encompassed by the mosaics 58 and their distances from landing surface 59 decrease in successive frames of the film so that cumulatively they define a spatial funnel closing upon the landing surface 59. Preferably, the images retained by each set of identically located film elements 56 in successive film frames comprise a hybrid set of photographic data representing a hypothetical landing approach path 61 to the landing surface 59 and the plurality of paths recorded by all sets of identically located film elements comprise all suitable approach paths converging at the landing surface 59.

Figure 5:
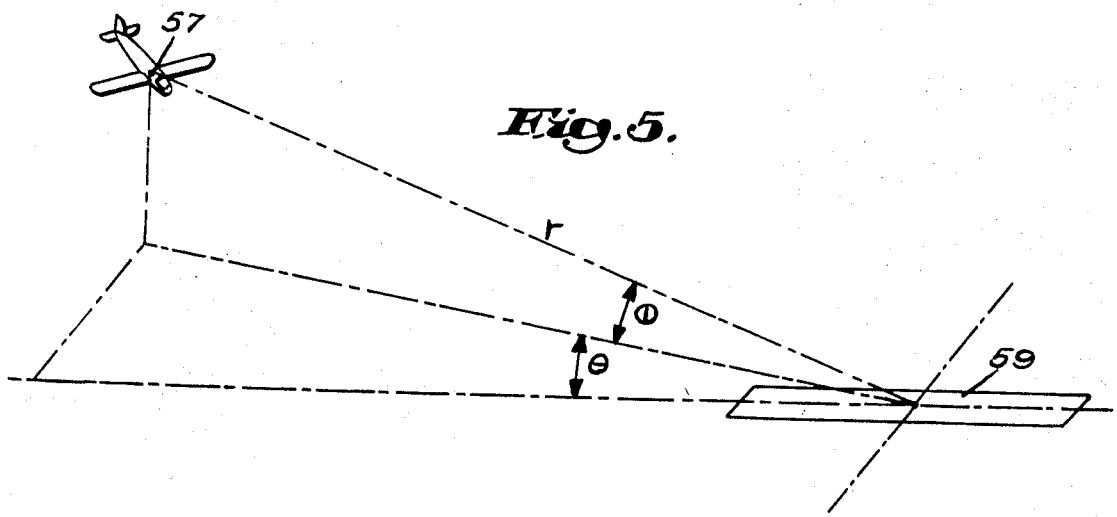
FIG. 5 is a geometrical diagram indicating the spherical coordinate system which identifies the various viewpoints shown in FIG. 4 relative to a landing surface 59.

Each of the aspect positions 57 can be identified (as shown in FIG. 5) in terms of spherical coordinates $r$, $\Phi$ and $\Theta$ computed from the midpoint of the landing surface with $r$ representing range, $\Phi$ representing glide slope, and $\Theta$ representing azimuth angle. Also, since the various positions 57 in each mosaic 58 are substantially, uniformly distributed, the sets of positions, of equal azimuth angles $\Theta$ can be given (FIG. 6) arbitrary $i$ values of $0, \pm1, \pm2 .... \pm n$ and the sets of positions of equal glide slopes $\Phi$ can be given arbitrary $j$ values of $1, 2, 3 .... n$. With these same designations applied to the film elements 56 as shown in FIG. 3, the film elements representing any particular aspect position can be identified by reference to its $j$, $i$ and frame numbers. It will be appreciated that the film elements 56 representing a given approach path 61 will bear the same $j$—$i$ designations in all film frames 55.

For reasons described more completely below, the uniformly distributed film elements of each original film frame 55 are separated so that elements representing directly adjacent aspect positions are separated from each other by elements representing other aspect positions. In a preferred embodiment this separation is accomplished as shown in FIG. 3, wherein the film elements of each original film frame 55 are separated into four distinct film frame sections 60 which are serially joined to form the four separate filmstrips 61, 62, 63 and 64. The allocation of the film elements 56 is such that all elements having $i$ even, $j$ even designations are located in filmstrip 61, all film elements having $i$ even, $j$ odd designations are located in filmstrip 62, all film elements having $i$ odd, $j$ even designations are located in filmstrip 63, and all film elements having $i$ odd, $j$ odd designations are located in filmstrip 64. The separate filmstrips are combined with the projector units of FIG. 2 such that filmstrip 61 is associated with projector unit 42, filmstrip 63 is associated with projector unit 43, filmstrip 62 is associated with projector unit 45, and filmstrip 64 is associated with projector unit 44.

Basically, the invention functions in the following manner. Having been preset with certain initial conditions such as aircraft position and wind velocity the flight path computer interprets the pilot trainee's manipulation of the aircraft controls 33 to continuously establish hypothetical changing positions of the simulated aircraft 31. The optical display computer 36 receives this data and determines which particular film element 56 retains an image of an aspect position 57 most closely approximating the current hypothetical position of the simulated aircraft 31. Responsive to the feedback control signals provided by the optical selection computer 36, the cinematograph 38 selects and projects from each film frame 55, the image retained by the appropriate film element 56. For example, at any moment in time the simulated aircraft 31 will be hypothetically located close to one of the matrix element positions 57 such as the $i=-4$, $j=1$ position in FIG. 6. The film element 56 retaining a photograph of the scene before the aircraft taken from this position will then be projected. At the next instant of time 1/24 seconds or at a simulated displacement of about 9.2 feet, at jet aircraft approach speeds, the scene from the appropriate film element 56 in the next film frame 55 will be shown. Normally, the simulated aircraft will follow a curved path within the envelope of available flight paths as the vehicle is flown into the field. Thus, assuming that the simulated aircraft is flying in at a fixed glide slope toward the runway as shown in FIG. 7, the projection sequence to be followed to simulate the view obtained on this flight path would require the projection of the $i=5$ element for frames, $k$, $-2$ through 11, then switch to $i=4$ for $12 \leq k \leq 19$, $i=3$ for $20 \leq k \leq 27$, $i=2$ for $28 \leq k \leq 35$, $i=1$ for $36 \leq k \leq 43$, $i=0$ for $44 \leq k \leq 52$ $i=-1$ for $53 \leq k \leq 64$, $i=-2$ for $65 \leq k \leq 74$, then swinging back $i=-1$ for $75 \leq k \leq 85$ and finally on course $i=0$ for $86 \leq k$ to touch down.

During this run through the sequential film elements, the angle of the aircraft with respect to the line of sight from each aspect position will vary. The variation of attitude can be simulated by so rotating projector lens 41 that for the fist 74 frames the field appear once the right, then on the left until the 90th frame where it appears in front of the aircraft. Changes of attitude, roll and pitch could be continuous. Since projection frame rate would be at average motion picture rates, and variation from the average used to simulate flight speed variations, the change of scale on approaching the field would appear continuous Thus, a pilot trainee views on the screen 39 a realistically changing and completely unprogrammed display of an approaching landing surface 59.

The special conditions of visual simulation for aircraft flight training permit simplifications and allow one to devise rules regarding the number of distinct film elements required in each film frame. First, a specific mission can be set up, such as landings, takeoffs, airfield approach, taxying, etc. Each mission will be controlled by the aircraft characteristics and by the restriction on altitude, glide slope, and traffic control patterns at airfields. There restrictions serve to define a permissible approach path envelope for the flight training mission in such a manner that if the flight path deviates from this envelope the mission will be taken to be a failure. Because failure, such as a missed approach will require a repeat it is not necessary to represent viewpoints outside the prescribed envelope volume. For this reason and because of the substantial spacing between the adjacent aspect positions 57 in each mosaic 58, all suitable approach paths to a given airfield can be represented with a finite number of film elements in each film frame.

Referring now to FIGS. 8—12, there are shown more detailed views of the selector projector unit 42 which is identical to the projector units 43, 44 and 45. The film transport carriage 71 is slidably mounted on the ball slides 72 supported from opposite ends of the projector base 73. Rotatably mounted between a pair of carriage ears 74 at each end of the film carriage 72 are the film reels 75 which carry the filmstrip 61. Attached to each of the shafts 76 supporting the film reels 75 is a synchronous reel drive motor 77. The film frame carriage drive motor 67 is mounted on the projector base 73 and drives the belt 68 which extends over the drive pulley 69 and the remotely mounted return pulley 70 and has ends attached to transversely opposite sides of the film carriage 71. Thus, energization of the carriage drive motor 67 produces transverse movement of the carriage 71 and supported film 61 in a direction determined by the direction of motor rotation.

The film gate 78, shown schematically in FIg. 11, is mounted for movement on the ball slides 79 which are supported at their ends by supports 81 on the bottom plate 82 of the film transport 71. Forming the film gate 78 is the pair of attached rectangular plates 83 having coincidental, rectangularly shaped apertures 84 adapted to accommodate the film frame sections 60. The film slots 85 formed between the plates 83 at each end of the film gate 78 permit passage of the film 61 therethrough. Also mounted on the carriage baseplate 82 are the stepping drive motor 86 and the spring biased mechanical detent 87 adapted to engage the fine alignment notches 88 in the film gate 78. Associated with the drive motor 86 is the pinion gear 89 which engages the rack gear 91 to produce movement of the attached film gate 78 on the ball slides 79.

Also mounted on the film gate plates 78 is the intermittent drive motor 97 which produces intermittent movement of the film 61 from frame to frame through the film gate 78 with a conventional geneva-type mechanism (not shown). Supported by the film transport carriage 71 between each of the film reels 75 and film gate 78 are the pressure rollers 93 and the feed rolls 90 (FIG. 10) which carry at each of their ends the film engaging sprocket wheels 94. The synchronous drive motor 95 (FIG. 9) directly drives one of the feed rolls and drives the other via the engaging drive chain 96. Mounted on the projector base 73 is the spring biased mechanical detent 98 adapted to engage the fine positioning notches 99 in the carriage base plate 82.

Figure 12:
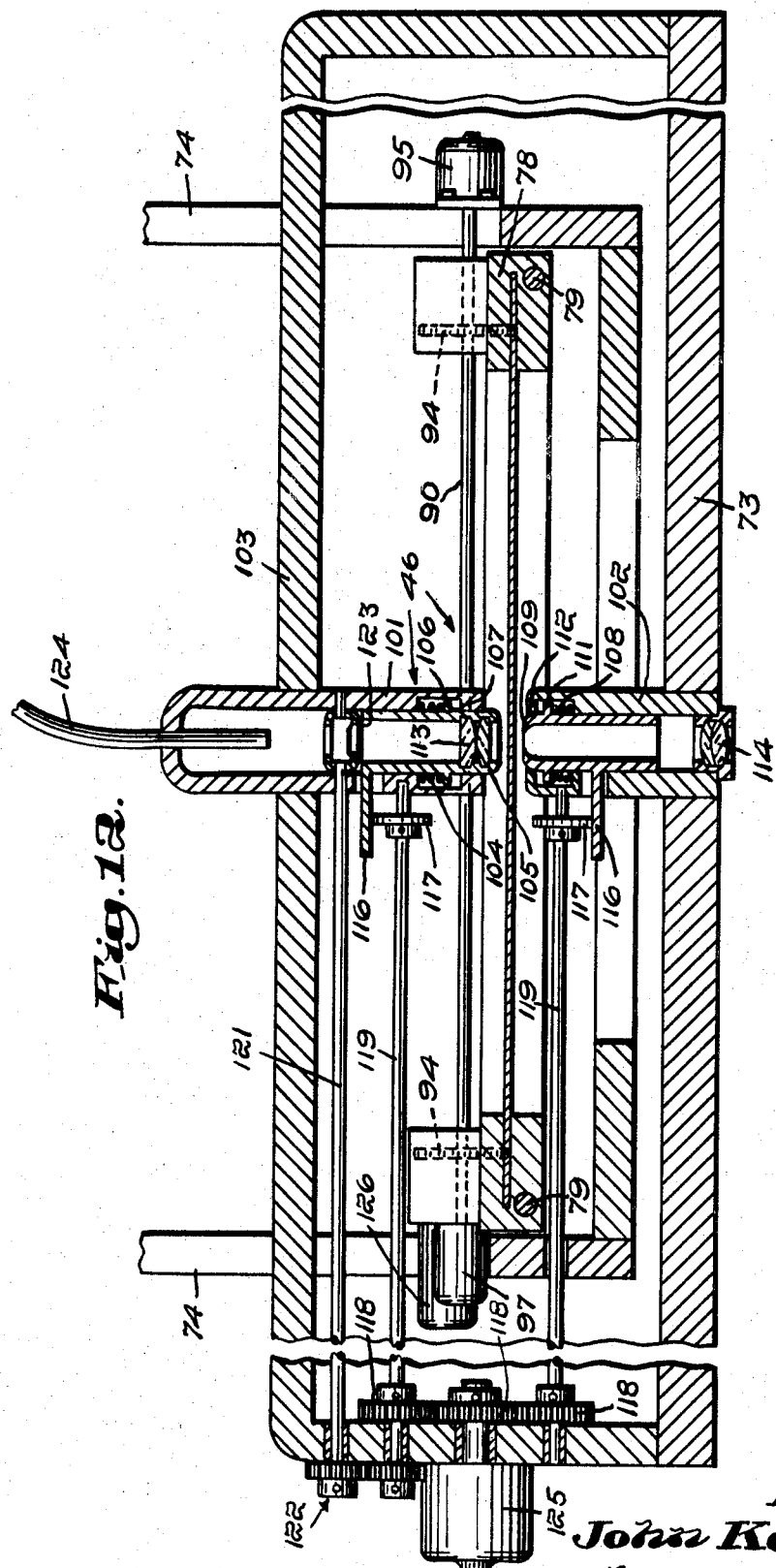
FIG. 12 is a cross-sectional view of the projector unit shown in FIG. 10 taken along lines 12–12.

Shown more clearly in FIG. 12 is the fixed optical system 46 including the bushings 101 and 102 which straddle the film gate 78. The lower bushing 102 is mounted on the projector base plate 73 and the upper bushing 101 is supported by the crossbar 103 which is attached to opposite sides of the projector base 73. Mounted for movement within the bushing 101 and biased downward by the cylindrical spring member 104 is the upper focal plane clamp 105. Attached to the upper cup clamp 105 is the stop flange 106 adapted to engage the internal bushing shoulder 107. Similarily mounted in the lower bushing 102 and biased upward by the cylindrical spring member 108 is the lower focal plane clamp 109 having the shoulder stop 111 adapted to engage the internal bushing shoulder 112. The optical condenser 113 is positioned within the upper cup clamp 105 and the objective lens 114 is fixed in an aperture extending through the bottom plate of projector base 73. Attached to the upper and lower cup clamps 105 and 109 and extending through slots in the upper and lower bushings 101 and 102 are the drive pins 116 adapted for periodic actuation by the Lumiere cams 117 which are connected to the gears 118 by the shafts 119. Projecting through a slot in the upper bushing 101 is the shaft 121 having an outer end connected to the drive gear 122. Attached to the inner end of the shaft 121 is the open ended shutter cell 123 which intermittently transmits light to the condenser 113 from the light pipe 124. All of the drive gears 118 and 122 are synchronously driven by the Selsyn drive 125 electrically coupled to the Selsyn transmitter 126 associated with the intermittent film drive motor 97.

During operation of the cinematograph 38, the film gate drive motors 86 respond to feedback control signals from the optical display computer 36 and produce selective longitudinal movement of the film gates 78 so as to align a given $j$ film element in each film frame section 60 with the optical systems 46. Since alignment is insured by the mechanical detents 87 which engage the positioning notches 88 accurately aligned with the selected $j$ film elements. Similarly, the film carriage drive motors 67 respond to feedback signals from the optical selection computer 36 and produce selective transverse movement of the film transport 71 on the ball slides 72 so as to align the optical systems 46 with the designated $i$ filmstrip element 56 in each frame section 60. Fine positioning is insured by the mechanical detents 98 which engage the positioning notches 99 aligned with the selected $i$ elements. Thus, by selective energization of both the carriage drive motors 67 and the film gate drive motors 86, the projector units 42, 43, 44 and 45 will select for projection by the optical systems 46 any particular film element 56 located in any of the film frame sections 60.

The possibility of projecting unfocused images caused by flutter of the filmstrips 61—64 in the relatively large film gate apertures 84 is prevented by the film cup clamps 105 and 109 which close during the film dwell time to fix the focal plane of the optical system 46 on the selected film elements 56. Conversely, adequate mechanical clearance is provided during film movement by the Lumiere cams 117 which intermittently engage the actuating pins 116 forcing the upper film clamp 105 in an upward direction against the bias of the cylindrical spring member 104 and force the lower film clamp 109 downward against the bias of the cylindrical spring 108. Synchronism between the film movement and movement of the film clamps 105 and 109 is assured by utilization of the Selsyn drive 125 and the Selsyn transmitter 126. Preferably, the various drive motors of the projector units 42—44 are energized by a frequency generator (not shown) common to all system projectors thereby insuring that all filmstrips 61—64 are kept in phase from the beginning of the training run.

Referring back to FiG. 6, it can be seen that a deviation in simulated flight path from that represented by a given $i$, $j$ aspect position 57 in all of the position mosaics 58 requires a change of designated aspect position parity. For example, the eight aspect positions adjacent the position designated $i=2$ (even), $j=2$ (even) are $i=2$ (even), $j=3$ (odd); $i=3$ (odd), $j=3$ (odd); $i=3$ (odd); $i=3$ (odd), $j=2$ (even); $i=1$ (odd), $j=2$ (even), $j=1$ (odd), $i=1$ (odd), $j=1$ (odd); $i=1$ (odd), $j=2$ (even); and $i=1$ (odd), $j=3$ (odd). Thus, none of the surrounding aspect positions bear the even-even parity of the ($i=2$, $j=2$) position. Referring now to FIG. 3, wherein the various film elements 56 were given the same $i$, $j$ designations as their aspect position counterparts, one can observe that because of the parity grouping of the film elements in the various filmstrips 61—64, any change of film element parity requires a change of filmstrip. For example, the $i=2$, $j=2$ film element representing the above-noted aspect position is located in filmstrip 61 while, of the film elements representing the eight adjacent aspect positions the ($i=2, j=3$) and ($i=2, j=1 i=3, j=2$)
and ($i=1, j=2$) film elements are located in film strip 63; and the ($i=3, j=3$), ($i=3, j=1$), ($i=1, j=1$) and ($i1, j3$) film elements are located in filmstrip 64. Consequently, the film element representing any possible deviation from a presently simulated flight path being projected by one of the projector units 42—45 will be located in a filmstrip associated with a different one of the projector units. Therefore, the film element representing any such flight path deviation can be preselected by a then nonprojecting projector unit eliminating the extremely difficult requirement for switching film elements during the film frame pulldown time.

Applying this technique to the training flight path illustrated in FIG. 7 and assuming a constant glide slope represented by the $j=2$ film elements, the projection lens 41 would receive images retained by the ($i5, j=2$) film elements in filmstrip 63 for frames $-2 \leq k \leq 11$; the ($i=4, j=2$) film elements in filmstrip 61 for frames $12 \leq k \leq 19$; the ($i=3$, $j=2$) film elements in filmstrip 63 for frames $20 \leq k \leq 27$; the ($i=2, j=2$) film elements filmstrip 61 for frames $28 \leq k \leq 35$; etc. Deviations in glide slope would be similarly accomplished by shifting to film elements in film strips 62 or 64.

One should observe here, however, that the space quantization created by the position mosaics 58 provides sets of airfield 57 views in which the shape of the runway configuration varies from one aspect position 57 to another. Therefore, quickly switching from a film element representing one approach path to a film element representing a different approach path would create a jerky rotation of the airfield about the point of convergence of the azimuth angle and glide slope viewpoints for the two paths. This step-like swing must be smoothed to simulate the free motion of the aircraft. In accordance with this invention two techniques are applied to obtain the required smoothing. First, instead of directly switching from one film element designation to another as the simulated aircraft crosses the midpoint between different approach paths, there is produced from one view to the next a lap dissolve, in which the view at the midpoint is the average of the two views, thereby effectively smoothing the transition. The length of the dissolve in projection is controlled by the flight path and optical display selection computers. Second, the angles in azimuth $\Theta$ and elevation $\Phi$ defining the aspect position 57 are selected so that the apparent changes in the primary object shape, in this case the airfield, from one aspect position to its neighbor are subtle. In the view of a landing strip the most rapid changes of perspective occur when the aircraft is aligned with the centerline of the strip. This is illustrated in FIG. 13 wherein the shapes of a 200 ft. wide by 10,000 ft. long runway are shown which would be seen from an aircraft at an altitude of 1,220 feet, an elevation angle of 3.5° and the indicated azimuth angles. The change in perspective for a 1° shift in azimuth is seen to be drastic. At larger angles, from 4° to 5°, the perspective change is not as noticeable. Thus, a logarithmic set of azimuth angles, as shown in FIG. 14 yields the desired subtlety of perspective change with a reasonable number of different aspect positions.

Figure 15:
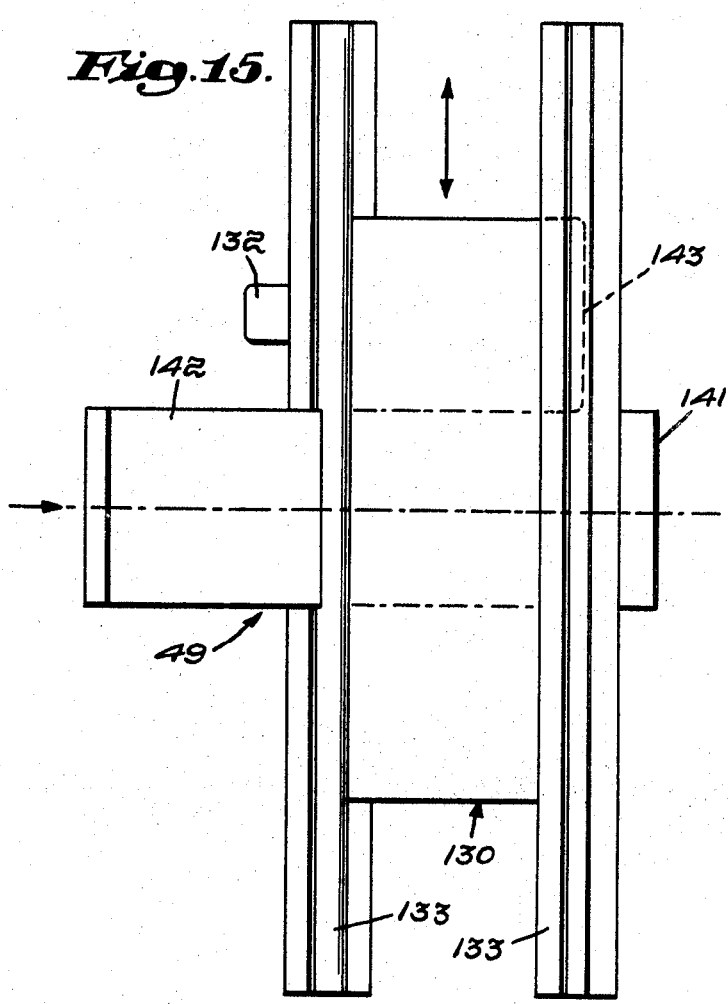
FIG. 15 is a plan view of one of the optical mixers shown schematically in FIG. 2.
Figure 17:
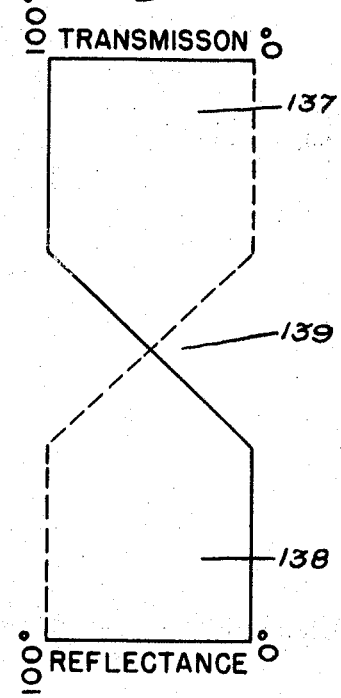
FIG. 17 is a graphical presentation illustrating the optical characteristics of the mixing plate shown in FIGS. 15 and 16.
Figure 16:
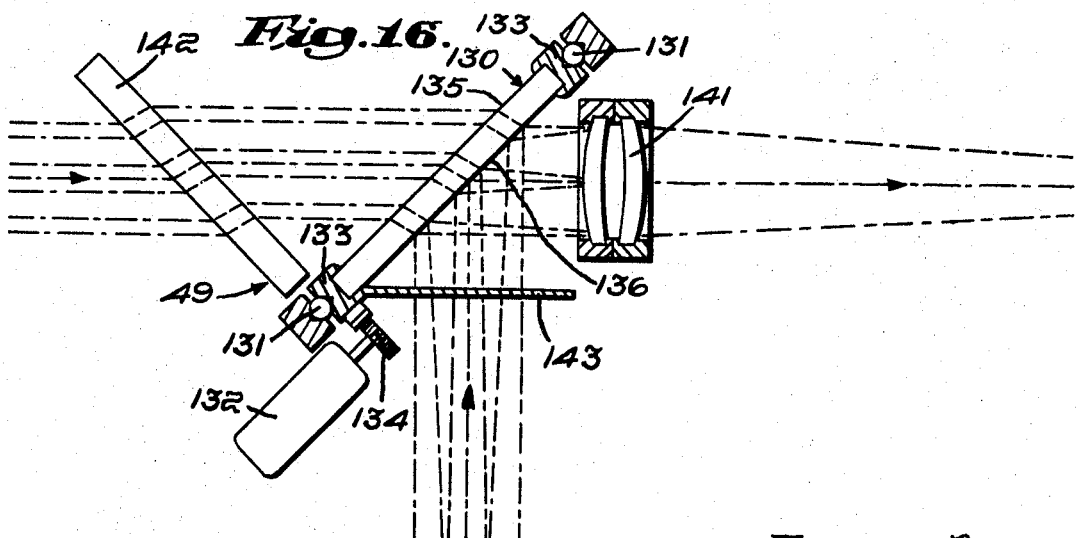
FIG. 16 is an end view, partially in cross section, of the optical mixer shown in FIG. 15.

The manner in which the above noted lap dissolves occur will be clarified by a description of FIG. 15 and 16 illustrating in greater detail the optical mixer 49 which is identical to the optical mixers 51 and 52, all shown schematically in FIG. 2. The optical mixer 49 consists primarily of the optical mixer plate 130 mounted for reciprocating movement along the straddling ball slides 131. Selective movement of the mixer plate 130 is introduced by the servomotor 132 which drives the mixer plate frame 133 via the rack and pinion gear assembly 134. The mixer plate 130 is positioned so as to receive on its back surface 135 the projected image from the filmstrip 61 selected by the projector unit 42 and on its opposite surface 136 the projected image form the filmstrip 63 selected by the projector unit 43. As illustrated by the light transmission chart illustrated in FIG. 17, the mixing plate 130 is a mirror so coated that the end portion 137 is 100percent light transmissive, the end portion 138 is 100percent light reflective and the intermediate portion 139 possesses a degree of light transmissivity which varies uniformly between the end portions 137 and 138. The mixing plate can, for example, be an aluminized mirror if the graded region in portion 139 is screened so that the fractional area covered by mirror surface changes uniformly over the transition region. A sharp cut between reflective and transmissive regions would, except for a location inside a lens, tend to create an undesirable window blind effect. The motor 132 is controlled by the optical display selection computer 36 to move the mixer plate 130 into positions wherein the optical paths from the projector units 42 and 43 are aligned with either the end portion 137, the end portion 138 or the intermediate portion 139. Upon alignment of end portion 137 the mixer plate 130 transmits through the relay lens 141 only the image received from the film 61. Conversely, upon alignment of end portion 138, the mixing plate 130 reflects through the relay lens 141 only the image received from filmstrip 63. However, upon alignment of the intermediate portion 139, the mixer plate 130 combines both images by partially transmitting the image from the filmstrip 61 and partially reflecting the image from the filmstrip 63. It will be appreciated that during movement of the intermediate portion 139 across the optical path, a gradual lap dissolve will occur wherein the image from one of the filmstrips will be gradually and uniformly supplanted by the image from the other filmstrip.

Also shown in FIGS. 15 and 16 are the deviation correction plate 142 positioned in the optical path from the projector unit 42 and the opaque capping plate 143 attached to the frame 133. The capping plate 143 is positioned to intercept light from the projector unit 43 when the mixing plate end portion 137 is in alignment with the optical path. This prevents surface reflection by the end portion 137 of the image received from the filmstrip 63.

The optical mixer 51 functions identically to the optical mixer 49 except that it either selects or combines in a lap dissolve the images received from the projectors 44 and 45 and relays them to the optical mixer 52. Similarly, the optical mixer 52 either selects or combines in a lap dissolve the images received from the optical mixers 49 and 51 and relays them to the common projector lens 41. Thus, in response to control signals from the display selection computer 36, the optical relay system 48 selects and relays to the projection lens 41 the scene transmitted by a particular one of the projector units 42—45. The scene selected is that which most closely approximates the view from the hypothetical position of the simulated aircraft 31 as determined by the flight path computers. In addition, the optical relay system 48 combines in a lap dissolve the scenes (illustrated by the overlapping film element blocks in FIG. 7) transmitted by two of the projector units 42—45 when the simulator aircraft 31 is shifting from one recorded flight approach to another.

Visibility conditions substantially affect the view of a surface scene observed from an airborne craft. For this reason, the simulation of varying visibility conditions is an extremely important factor in flight training. The cloud imagery producing devices 53 (FIG. 2) selectively provide in the optical display cloud imagery which is uniquely associated with the projected surface scene. Schematically shown in FIG. 18 are the various components comprising one of the cloud imagery producing devices 53, The scene relayed from the optical mixer 49 is focuses by the field lens 151 onto the cloud imagery retaining filmstrip 152 positioned in the film gate 153. The resultant image including the original scene and the superimposed cloud imagery is relayed by the relay lens 154 to the optical mixer 52. The filmstrip 152 is fed between film reels 155 and passes through sprocketed feed rolls 156 on each side of the film gate 153. Preferably, the film gate 153 is similar to the film gate 78 described above and includes the drive motor 157 adapted to produce selective, reciprocal movement of the film gate 153 in the direction of filmstrip movement.

Preferred cloud imagery retaining filmstrips for use in the devices 53 are shown in FIGS. 19–19a. Each of the filmstrips 152 and 158 is formed by individual film frames 159 having three distinct cloud imagery retaining film elements 161. The individual cloud film elements 161 in each film frame 159 retain cloud imagery which typically appears at different rates of descent through the clouds, depending on the glide slope angle Φ. Represented by the individual cloud film elements 161 are cloud formations associated with the different glide slope or altitude view points represented in the filmstrips 61—64, and the cloud elements 161 are given corresponding j designations. As shown, the elements 161 representing j even descending paths are located in filmstrip 152 and the elements 161 representing j odd descending paths are located in filmstrip 158. Thus, by suitably positioning the film gate 153, one can select a cloud film element 161 representing a particular j even glide slope or altitude in each frame 159 of the filmstrip 152. Also, since the filmstrips 61 and 73 utilized in the projectors 42 and 43 possess only film elements 56 associated with glide slope or altitude viewpoints of j even designation, a matching of glide slope or altitudes represented by the cloud imagery in the cloud filmstrip 132 and of the scene relayed by the optical mixer 49 is always possible.

The cloud producing device 53 located between the optical mixers 51 and 52 is identical to that shown in FIG. 18 except that filmstrip 158 is utilized. This again permits an altitude matching of cloud film elements 161 and surface scene film elements 56 because the film strips 62 and 64 utilized in the projector units 44 and 45 possess only film elements of j odd designation as do all of the cloud film elements 161 in the cloud filmstrip 158. It will be apparent also that only scenes from film elements of j even altitude designation are relayed from the optical mixer 49 and only scenes from film elements of j odd designation are relayed by the optical mixer 51. Accordingly, any glide slope deviation in a simulated approach path requires that a switch be made as to the scene from which of the optical mixers 49 and 51 is relayed to the projector lens 41 by the optical mixer 52. Therefore, only two cloud producing devices 53 are necessary to permit either preselection of a cloud film element 161 appropriate to a predicted glide slope change or transient combination in a lap dissolve of cloud imagery associated with both the current and new paths.

Additional realism can be obtained by use of the que strips 168 with the cloud filmstrips 152 and 158. The que strips 168 are programmed with information relating to the turbulence conditions normally associated with the cloud imagery retained by the adjacent film elements 161. Thus, by feeding control signals from the que strips 168 to the flight path computers, the simulator aircraft 31 can be mechanically and selectively agitated to simulate the turbulence typically related to the cloud imagery being displayed on the screen 39.

The haze projector 165 shown in FIG. 18 can be used to simulate haze in the photographic display. By utilizing a light scattering Kalvar film for the cloud filmstrips 152 and 158 haze simulation can be introduced by illuminating the filmstrips with the haze projector 145 located approximately as shown. In addition, adjustable masks 166 and 167 can be used to create variable haze effects.

Utilizing the above described equipment, a typical view from the simulator aircraft 31 on flying through cloud cover would consist of foreground clouds, at first blocking out any view, then growing lighter, and finally breaking out with a scene of low lying, tufted clouds just above the aircraft. A hazy or dark scene of the terrain below could be created with the haziness produced by the added light reflected from the Kalver film, and possibly by shifting the cloud films out of focus.

FIG. 20 schematically illustrates a preferred light source arrangement for the individual projectors 42, 43, 44 and 45. The light source consists of a point source xenon lamp 171 partially surrounded by the spherical mirror 172 which reflects light to the four light condensers 173 associated with the light pipes 124. By utilizing a common light source for all projector units 42—45 in the system, illumination variations will not occur when switching from one flight approach path to another.

Figure 21:
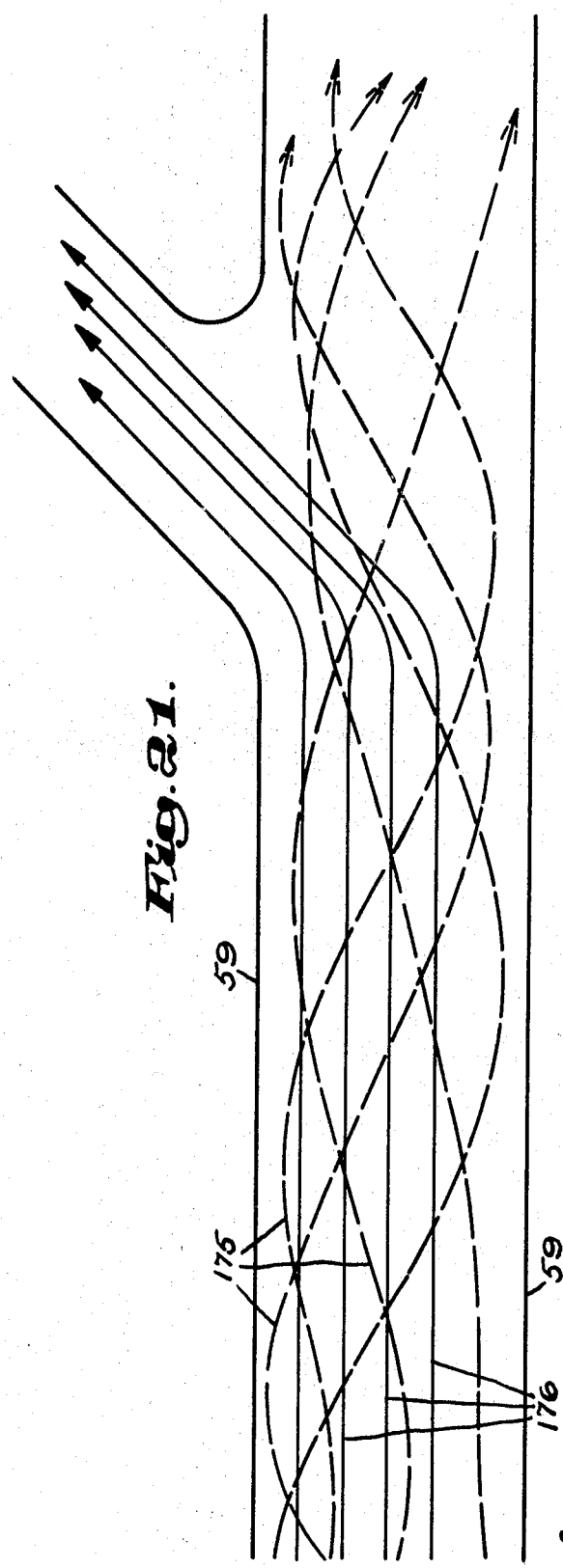
FIG. 21 is a schematic illustration of preferred taxying paths photographically retained by the cinematographic film of FIG. 3.

Very realistic taxying viewpoint simulation is obtained by continuing the various approach paths 61 (FIG. 4) in the manner illustrated by FIG. 21. As shown, the plurality of serpentine paths 175 are interlaced progressively with the straight paths 176 along the landing strip 59. This mixing of serpentine and straight taxying paths permits greater optical viewpoint selection flexibility after setdown of the simulated aircraft 31 and also permits the continuous visual simulation of paths 175 which are not parallel to the landing strip 59. Preferably, the film elements 56 retaining scenes viewed from the paths 175 and 176 would be distributed in the filmstrips 161—164 so that elements representing one set of alternate straight paths 176 would be located in one strip, elements representing the other alternating straight paths 176 would be located in a second strip, elements representing one set of alternate serpentine paths 175 would be located in a third strip and elements representing the other alternating serpentine paths 175 would be located in the fourth strip. With this distribution, the film elements representing views in any likely new path would be located in a filmstrip other than that retaining the elements representing a preset path. Selection of film elements representing an appropriate taxying path would take place in the same manner as would the above-described selection of film elements representing a particular approach path. The total number of taxying paths 175 and 176 can substantially exceed the number of different azimuth approach paths (FIG. 6) because after landing all the different glide slopes will have merged thereby providing in each film frame an excess of $j$ elements which can be used for additional taxying paths. This is of significant importance since, to maintain realism at the very close visual ranges existing after landing, it is highly desirable to minimize any viewpoint discontinuities in the adjacent film frames.

Figure 22:
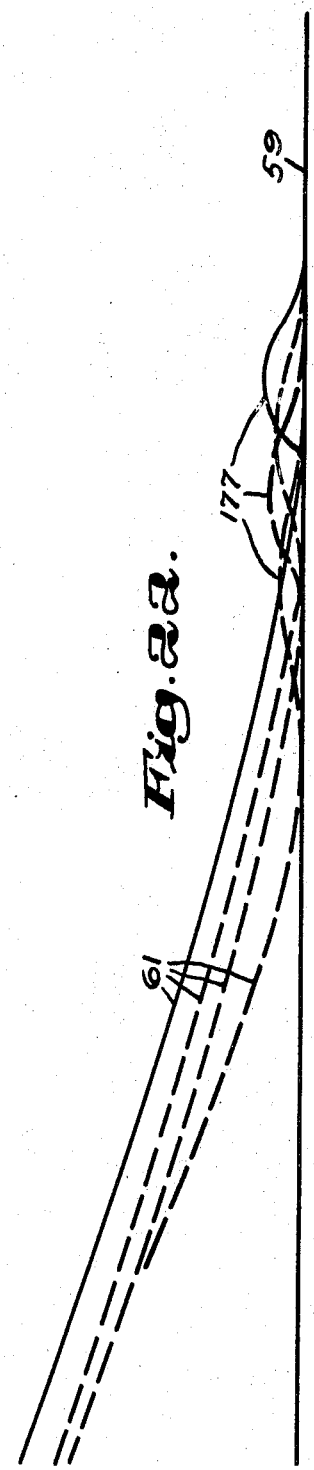
FIG. 22 is a schematic illustration of preferred touchdown paths photographically retained by the cinematographic film shown in FIG. 3.

FIG. 22 illustrates how the visual effects produced by aircraft bouncing are realistically simulated at touchdown. The photographically retained scenes of the landing surface 59 viewed along each of the different glide slope approach paths 61 include views obtained along the bounce trajectories 177 wherein the aircraft briefly becomes airborne again after initial touchdown. The various bounce trajectories 177 are interlaced longitudinally along the landing strip 59 thereby providing a plurality of different touch down bounce path possibilities. As above, adjacent bounce trajectories 177 are preferably represented by film elements in different filmstrips so as to facilitate visual simulation of path deviations.

The following is a general explanation of how the visual selection computation device 36 relates the scene to be projected to the hypothetical position of the simulated aircraft 31 and controls the selection of appropriate film elements 56. In a typical situation the pilot trainee will be seated in the cockpit 32 which contains the controls 33 and indicators 34 normally present in actual operational aircraft. In a conventionally designed aircraft simulator the controls will cause the entire simulator to move responding in a kinesthetically realistic manner to the changes of pitch, roll and vertical acceleration encountered in actual flight. The actual movements are not as great in magnitude, even if the pilot senses them to be realistic, as in reality. The full magnitude of the effect of control movement is, however, reflected in the behavior of the indicators 34 in the cockpit 32. These indicators, for example, the altimeter, the compass, the air speed, pitch, and roll indicators, engine monitors, navigating equipment, and the various radio aids, are all affected by control motion through the flight simulator computer 35. Thus, to present an accurate picture of the simulated aircraft path to the pilot trainee, the simulator computer 35 will have computed data as to altitude heading, ground speed, drift, roll, pitch, and the momentary direction of the flight path. These data are typically available in digital form, or would be converted into digital form at the system interface.

The various parameters provided by the simulator computer 35 can be separated into two groups; altitude, ground speed, the actual flight path direction and/or the momentary position coordinates, and the derivatives of these parameters, in the first group; and roll, pitch, and yaw in the second group. All of these data are used as input to the visual selector feedback digital computer 36.

The two groups of data are separated, the first group of data being used to select the scene to be projected on the screen 39 at a given point along the simulated flight path.

The second group of data, Y for roll, $\xi$ for pitch, and $\psi$ for altitude, are used to control the location and angle of the displayed scene. The flight simulator 31 is moved about to simulate roll and pitch, although not in true proportion to the magnitude of these variables. Thus it is necessary to compute the residual errors in roll and pitch, Y vis =Y true −Y sim and $\xi$ vis =$\xi$ true −$\xi$ sim, where Y vis, $\xi$ vis are the residual quantities, and compensate for these by rotating and tilting the projected scene so that the result places the scene in correct orientation to the simulator cockpit 32. The third variable $\psi$, governing the azimuthal location of the image about the vertical axis, will be added to the value of the direction of the actual flight path measured from the direction of the projected flight paths.

The first group of data giving the actual aircraft location in terms of the flight simulator coordinate system will be transformed into the coordinate system of the visual selection system in which each film element 56 available for projection is characterized by the range, azimuth, and elevation or altitude of the viewpoint position 57 represented thereby. In the case of landing or takeoff simulator situations, these parameters are measured, as shown in FIG. 5, from a fixed point, and the center line of the runway 59.

As described above, the filmstrips 61—64 generally provide visual data for flight paths within a limited tubular volume of space, of finite length. The operator of the flight simulator in conducting a training mission begins the exercise from some specified location or check point at some distance, above or in clouds, from the region in which a visual display is required. Referring to FIG. 23, this point can be characterized as being at a point $R$, $\Theta h$, from a reference point $x$ in the visual selector coordinate system, assuming an aircraft landing exercise where the Range $R$ is beyond the coverage of the film data. It will be obvious that cartesian coordinates would be equally applicable in certain applications, as in low level flight training. When the exercise is begun the aircraft is presumed to be moving at a velocity $v_o$ with a compass heading $\alpha_I$, a yaw of $\psi_I$ and pitch $\xi_I$. The compass bearing of the $\Theta_I$, $R_1$ line is taken to be $\alpha_o$.

The Reference Position Computer (FIG. 24b) takes this input information and the flight variable from the Simulator Computer (FIG. 24a) and derives $$\frac{dr}{dt} = v(t) \cos \chi(t) \cos [\alpha_0 - \theta_\mathrm{I} + \theta(t) + \alpha(t) - \Psi]$$

$$\frac{d\phi}{dt} = \frac{1}{R(t)} v(t) \cos \chi(t) \sin [-\alpha_0 = \theta_\mathrm{I} + \theta(t) + \alpha(t) - \Psi(t)]$$

and $$\frac{dh}{dt} = \Psi(t) \sin \chi(t)$$

the change in elevation, or $$\frac{d\phi}{dt} = \frac{1}{R(t)} V(t) \sin \chi(t)$$

For the change in elevation angle where the position at a time $t$, $R(t)$, $\Theta(t)$, and $h(t)$ or $\Phi(t)$ is given by $$R(t) = R_\mathrm{I} + \int_{t=0}^{t} \frac{dR(t)}{dt} dt \qquad \theta(t) = \theta_\mathrm{I} + \int_{t=0}^{T} \frac{d\theta(t)}{dt} dt$$

and $$h(t) = h_\mathrm{I} + \int_{t=0}^{t} \frac{dh(t)}{dt} dt, \qquad \phi(t) = \mathrm{Tan} \frac{h(t)}{R(t)}$$

These quantities, along with the pitch, roll and yaw residuals, constitute the principle output of the Reference Position Computer. For a time during a typical exercise the simulator aircraft flight will be outside of the coverage of the visual system, a cloud cover being presumed so that a display is presented of sky and a cloud deck below the aircraft. At some range close to the outer limit of the visual coverage the pilot will begin his descent. During this time the computer is continually interrogating the Programmed Path Memory (FIG. 24b) for the existence of data at the present $R$ and at $R(t + \Delta t)$, where the prediction time interval $\Delta t$ is the time required to bring the projector carriages 71 and film gates 78 into position. When the range $R(t+\Delta t) = R_o$, the set of viewpoint locations $\Theta_i, \Phi_j$, denoting the various film elements 56 in the film frames 55 available for display, at the range $R_o$ are read out of the memory. As these quantities are read out serially they are compared to $\Theta(t)$ and $\Phi(t)$ of the flight path to find the programmed path which is most nearly coincident with the flight path at the position $R(t)$. At the same time a search is performed for the $\Theta_i$ and $\Phi_j$ element which will be required when the flight path reaches the maximum display range $R_o$, that is for $$\theta_{i\pm 1} \simeq \theta(t) + \int^{\Delta t} \frac{d\theta}{dt} dt$$

and $$\phi_{j\pm 1} \simeq \phi(t) + \int^{\Delta t} \frac{d\phi}{dt} dt$$

The selector mechanism of the projector units 42—44 (FIG. 24c) will now position the filmstrips 61—64 so that the four film elements 56 which will probably be required are in position for projection. As $\Delta t \to 0$ the actual flight path will be closer to the position represented by one of these elements than the others. This condition leaves the other three projector units free to be positioned for the next probable film element 56 predicted by computing $d\Theta/dt$ and $d\Phi/dt$. At $R_o$ the projector units 42—44 will become operative. The rate of closure $dR/dt$ is fed from the Reference Position Computer to the projection speed control (FIG. 24c) so that the change in the scene displayed accurately simulates aircraft velocity. Since the displacement along the radial distance between frames is $\Delta R$ the projection rate required will be $1/\Delta R \, dR/dt$. The Programmed Path Memory can contain values of $\Delta R(R)$ so that the actual projection rate can be held close to an average rate permitting flicker free projection over wide variations of velocity.

The operation of selecting a film element representing a given $\Theta_i \Phi_j$ position 57 and the projection of its retained image directly to the center of the screen 39 implies that the aircraft is actually flying along this programmed path. An actual flight path will generally fall at an angle across the programmed path. This direction of flight relative to the programmed path can be represented by rotating the projected image in azimuth about the vertical axis of the spherical screen 39. The angle of displacement, obtained from the hearing and yaw is $[\pi - \Theta(t) - \alpha(t) + o + \Theta + \psi(t)] = \psi_o$, is fed to the projection lens 41 gimbal mechanism. If the flight simulator 31 rotates abut its vertical axis the azimuthal image displacement applied to the screen image will be the difference between the required displacement and the simulator yaw.

The film element selection process of the various viewpoints 57 obtained during the flight mission proceeds substantially as described above for the selection of the first projected image.

At any given moment, $k$ an image giving the view of the scene before the aircraft from a position 57 in space $(R, \Theta_{ij})_k$ (FIGS. 5 and 6) will be projected on the screen. The actual position of the simulated aircraft at this moment will be $R, \Theta, \Phi$, so that the difference between the actual position and the displayed viewpoint position, ignoring $R$, is $\Delta\Theta = \Theta - \Theta_i$ and $\Delta\Phi = \Phi - \Phi_j$. The next required viewpoint position $[\Theta_i, \Phi_j]_{(k+1)}$ is obtained b extrapolation from the present position along the present real flight path until a closest match is obtained to data in the memory. The film element associated with this viewpoint image should be positioned for projection in one of the three nonprojecting units before a dissolve to it is required. As soon as this particular film element is positioned and before the dissolve beings, the film element representing the following viewpoint $(\Theta_i, \Phi_j)_{(k+2)}$ must be found by further extrapolation so that as soon as the dissolve from the first to the second film element is complete the appropriate projector unit can be positioned for the next required view in the sequence. Thus at any moment, that a scene for a position $(\Theta_i, \Phi_j)_k$ is displayed, one or more of the other three projector units are in position to project the scene from position $(\Theta_i, \Phi_j)_{k+1}$ to follow, and the next required scene or scenes of position $(\Theta_i, \Phi_j)_{(k+2)}$ has been determined by extrapolation.

The control over the lap dissolve from image to image can be effected by using the present position and the predicted path positions to drive the mixer plates 130 (FIGS. 15 and 16) directly. The deviation from the last position $\Theta_{ik}, \Phi_{jk}$, to the present position $\Theta, \Phi$ is $\Theta - \Theta_{ik}, \Phi - \Phi_{jk}$. The separation of the predicted paths is $\Theta_{i(k+1)} - \Theta_{ik}, \Phi_{j(k+1)} - \Phi_{jk}$. The ratio of these differences is then computed to give a desired $$\text{mixing ratio} = f\left(\frac{\theta - \theta_{ik}}{\theta_{i(k+1)} - \theta_{ik}}\right)$$

or $$f\left(\frac{\phi - \phi_{jk}}{\phi_{j(k+1)} - \phi_{jk}}\right)$$

depending on whether the dissolve occurs in azimuth or elevation. The ratio is taken as a function of the $\Theta$ and $\Phi$ differences to permit a dead zone in the region of $\Theta \simeq \Theta_{ik}$, $\Theta \simeq \Theta_{i(k+)}, \Phi \simeq \Phi_{jk}$, and $\Phi \simeq \Phi_{j(k+1)}$. The mixer plate 130 servo drive motor 132 voltage would be proportional to $$\frac{d}{dt} f\left(\frac{\theta - \theta_{ik}}{\theta_{i(k+1)} - \theta_{ik}}\right)$$

or $$\frac{d}{dt} f\left(\frac{\phi - \phi_{jk}}{\phi_{j(k+1)} - \phi_{jk}}\right)$$

The servomotor drive direction would be governed by the position of the mixer plate before the dissolve begins and would act like a bipolar device.

Further functions provided by the visual simulator control system include a read out to the flight simulator 31 of turbulent air conditions from the cloud filmstrips 152 and 158. In addition various manual inputs such as haze and visibility conditions which control the cloud film back illumination are provided and the cloud cover film can be changed to provide changes in ceiling height.

Because of the substantial distances between the viewpoint positions 57 represented in each film frame section 60, it will be obvious that the film elements 56 for an entire mosaic 58 of viewpoints cannot be obtained simultaneously with conventional motion picture techniques. Although the individual film elements can be obtained rather simply by photographing a model, the detail would lack realism, particularly since the resolution of a photographic system would easily show the defects in any model or would suffer due to limits in the depth of field.

The best results can be obtained by photographing a real airfield from an aircraft following an approach path, on a high overcast day, with a fish-eye lens, on color film. However, the necessity for obtaining photographs along each particular known approach path 61 requires extremely careful flight control which is not always possible in the variable air present at low altitudes. Therefore, a preferred technique uses approximate flight paths, measures the aircraft position during the approach, and then assembles paths from the almost randomly collected data.

Suitable photographic equipment (not shown) for obtaining the data would include an aircraft equipped with a gyrostabilized camera which could be locked on a fixed bearing, and kept level. The camera would be equipped with a fish-eye lens and use 35 or 70mm. color film. A time mark and frame number exposure device would be mounted in the camera and a frame number counter with a digital output would be fixed to the shutter.

In addition to the camera and stabilizer the photographic aircraft would be equipped with a receiver to obtain time marks and path deviation errors from the ground station, and a 5 channel recorder, to record frame numbers at the receipt of the time marks, as well as the output of camera roll, pitch and bearing error sensors.

The camera would preferably be mounted in the nose of the aircraft, and would thus be below the cockpit level. In the simulator the projector would be located (as shown in FIG. 1) above the aircraft simulator so that the photographic flights could be made at an altitude about 5 to 10 ft. above the prescribed paths. The approach flights could then be made down to the field without the need to land the photographic aircraft.

Along with the aircraft system a ground control system would be used to track the aircraft. The timing pulses transmitted to the aircraft would be used as sample data pulses for recording the tracking the odolite angles. A well surveyed base line and three angles would be required to locate the aircraft. Although a calculation of the actual location of the aircraft is not required at this point, some path indication is desireable so that flight path errors could be indicated in the aircraft.

The result of the flights, as well as runs on the ground by truck with a camera mounted on a lift to obtain touch down and taxi imagery will be a set of film rolls and two sets of related recorded data. The film rolls would then be edited to produce the required ideal flight path strips. To do this the location of each frame viewpoint on each roll would be computed. This would then be compared with the viewpoint positions 57 required for an ideal hypothetical approach path 61, (FIG. 4). A hybrid frame sequence to produce this path would be recorded on magnetic or paper tape. The ideal path on film is then constructed in a stepping printer which is controlled by the calculated frame sequence tape.

In order to print a specific $i,j$ ideal path 61 on one of the single filmstrips 61—64 the proper rolls of original film which include elements of the path would be sequentially positioned on the input reels. Starting at the head of the print stock with viewpoints at maximum range the print film and tape would step together frame by frame until the roll number of the first original strip on the printer was found. The input roll would then be advanced until the frame number on the original strip coincided with the requested number, at which point a film element 56 would be printed. This process would be repeated until all of the required film elements from the first input roll had been printed. Then the first input roll would be replaced by another containing frames required for the specific path. The print stock would be returned to the beginning and the above printing process repeated. Ultimately a complete filmstrip would be produced which would closely approximate a film which would have been obtained if the ideal path had been flown originally.

The above procedure would be repeated until filmstrips for all of the desired ideal approach paths had been synthesized from the original materials. These developed strips would be grouped by oddness or eveness of $i$ and $j$, and a group mounted in a matrix printer. This printer would handle a single azimuth row of the submatrices in one operation. Because the strips of a particular row would need to be printed at a fixed $j$ location, film advance in printing would be equal to the frame section 60 length. Multiple printing would be required to fill in all of the elevation or glide slope groups in the submatrix being printed. The film drive for all of the input rolls would be common and separate color correction channels would be required to normalize the separate strips to a common large area transmission density.

Obviously, many modifications and variations of the present invention are possible in light of the above teachings. For example, although the described flight training is a preferred application, it will be obvious that the invention can be used in other applications such as automobile driver training, ship navigation training, etc. Also, one can utilize many different arrangements of individual film elements, methods of preparing filmstrips, types of projection units, techniques of scene selection control, etc. without departing from the basic concepts presented by the invention. It is, therefore, to be understood that within the scope of the appended claims the invention can be practiced otherwise than as specifically described.

I claim:

1. Apparatus for visually simulating motion along a path, said apparatus comprising:
   a. a plurality of projectors focused on the same display area;
   b. a plurality of picture sequences, each sequence comprising a filmed approach along a separate known path toward a given pint, said plurality of known paths radiating from said point; and
   c. control means for said plurality of projectors for projecting onto said display area from said projectors a sequence of images of interspersed individual pictures from said plurality of picture sequences for visually simulating an approach to said point along a different path that crosses a plurality of said known paths.

2. Apparatus according to claim 1 wherein all of said picture sequences are grouped in a composite picture sequence formed by successive segments each comprising a plurality of pictures of said point viewed from different substantially equidistant aspect positions, and including projection feed means for feeding said picture segments sequentially through said projectors.

3. Apparatus according to claim 2 wherein said composite picture sequence comprises a plurality of physically separated picture sequences and pictures in each of said picture segments of said point viewed from directly adjacent aspect positions are located in different ones of said plurality of physically separated picture sequences.

4. Apparatus according to claim 3 wherein said control means comprises synchronized control means for simultaneously projecting by said projectors in each of said pictured segments the image of a picture in each of said plurality of physically separated picture sequences so as to form at said display area a superimposed image, and including mixing means for varying the relative contribution made to said superimposed image by the pictures in each of the physically separated picture sequences.

5. Apparatus according to claim 2 wherein pictures of said point viewed from directly adjacent aspect positions are physically separated in each of said picture segments by pictures of said point viewed from other aspect positions.

6. Apparatus according to claim 5 wherein said control means comprises synchronized control means for simultaneously projecting by said projectors in each of said picture segments the superimposed images of a plurality of said pictures of said point viewed from directly adjacent aspect positions, and including mixing means for varying the relative contribution made by each of said superimposed images.

7. Apparatus according to claim 6 wherein said pictures are photographic film elements, said composite picture sequence is a cinematographic filmstrip formed by said picture segments connected in series, and each of said picture segments comprise a plurality o said film elements transversely spaced apart on said filmstrip.

8. Apparatus according to claim 7 wherein said projectors include a fixed optical system and a carriage for supporting and transporting said filmstrip through said optical system, and said carriage being mounted for movement relative to said optical system in a direction transverse to filmstrip movement thereby permitting said carriage to align said optical system with the film elements located in a selected transverse location in said filmstrip.

9. Apparatus according to claim 8 wherein each of said picture segments comprises a plurality of said film elements longitudinally spaced apart on said filmstrip, and said projectors include a film gate movable relative to said optical system in the direction of filmstrip movement thereby aligning said optical system with the film elements located in a selected longitudinal location in said filmstrip.

10. Apparatus according to claim 1 including vehicle simulator means providing a view of said display area and, manually operable vehicle controls in said vehicle simulator means and operatively connected to said control means.

11. Apparatus according to claim 10 wherein said point is a point on an aircraft landing field.

12. Apparatus according to claim 11 including cloud imagery means for selectively superimposing cloud imagery on the images projected to said display area, said cloud imagery means including a cinematographic cloud filmstrip means and film transport therefor, said cloud film strip means comprising a plurality of film frames each possessing a plurality of discrete cloud film elements, the cloud film elements in each film frame retaining cloud imagery associated with a plurality of different altitudes, and said transport means includes selection means for selecting in each frame one of said plurality of cloud film elements for superimposition of its cloud imagery on said projected image.

13. Apparatus according to claim 12 wherein said cloud filmstrip means comprises first and second separate cloud filmstrips, said first cloud filmstrip possessing cloud film elements associated with one set of altitudes and said second cloud filmstrip possessing cloud film elements associated with a different set of altitudes alternating with those of said one set, and said transport selection means selectively superimposes the cloud imagery from either said first cloud filmstrip or said second cloud filmstrip on said projected image.

14. Apparatus according to claim 13 wherein said cloud filmstrip means comprises que strip means keyed with data regarding the cloud imagery retained by adjacent cloud film elements, and said que strip means is operatively coupled to movement control means for controlling movement of said vehicle simulator.

15. Apparatus according to claim 10 wherein all of said picture sequences are grouped in a composite picture sequence formed by successive segments each comprising a plurality of pictures of said point viewed from different substantially equidistant aspect positions, and including projection feed means for feeding said picture segments sequentially through said projectors.

16. Apparatus according to claim 15 wherein said composite picture sequence comprises a plurality of physically separated picture sequences and pictures in each of said picture segments of said point viewed from directly adjacent aspect positions are located in different ones of said plurality of physically separated picture sequences.

17. Apparatus according to claim 16 wherein said control means comprises synchronized control means for simultaneously projecting by said projectors in each of said picture segments the image of a picture in each of said plurality of physically separated picture sequences so as to form at said display area a superimposed image, and including mixing means for varying the relative contribution made to said superimposed image by the picture in each of the physically separated picture sequences.

18. Apparatus according to claim 15 wherein pictures of said point viewed from directly adjacent aspect positions are physically separated in each of said picture segments by pictures of said point viewed from other aspect positions.

19. Apparatus according to claim 18 wherein said control means comprises synchronized control means for simultaneously projecting by said projectors in each of said picture segments the superimposed images of a plurality of said pictures of said point viewed from directly adjacent aspect positions, and including mixing means for varying the relative contribution made by each of said superimposed images.

20. Apparatus according to claim 19 wherein said pictures are photographic film elements, said composite picture sequence is a cinematographic filmstrip formed by said picture segments connected in series, and each of said picture segments comprise a plurality of said film elements transversely spaced apart on said filmstrip.

21. Apparatus according to claim 20 wherein said projectors include a fixed optical system and a carriage for supporting and transporting said filmstrip through said optical system, and said carriage being mounted for movement relative to said optical system in a direction transverse to filmstrip movement thereby permitting said carriage to align said optical system with the film elements located in a selected transverse location in said filmstrip.

22. Apparatus for visually simulating a given scene as viewed from a particular aspect position, said apparatus comprising:
 a. a visual data recording comprising a plurality of pictures of said given scene as viewed from different known aspect positions,
 b. control means for selecting from said plurality of pictures a pair of particular pictures of said given scene as viewed from aspect positions nearest said particular aspect position, and
 c. projection means for projecting a composite display comprising the superimposed images of said particular pictures.

23. Apparatus according to claim 22 wherein said projection means comprises mixing means for varying the relative contribution made to said composite display by each picture of said selected pair of particular pictures.

24. Apparatus according to claim 23 wherein said control means comprises mixer control means for providing in said composite display a given ratio of contribution by said selected pictures, said given ratio being dependent upon the relative separation between said particular aspect position and each of the aspect positions represented by said particular pair of selected pictures.

25. Apparatus according to claim 23 wherein said mixing means comprises a mixer plate positioned to receive on one surface the projected image of one of said selected particular pictures and on an opposite surface the projected image of said other selected particular picture, said mixer plate comprising a mixing portion that is partially light transmissive and partially light reflective, the light reflectiveness of said mixing portion varying relative to its light transmissiveness in a given direction along the surface of said plate, and said mixing means further comprises motive means for producing relative movement between said mixer plate and said projected images in said given direction.

26. Apparatus according to claim 25 wherein said mixer plate comprises a fully light transmissive portion and a fully light reflective portion straddling said mixing portion in said given directions, said fully transmissive and fully reflective portions having sufficient surface area to receive the entire projected images of said pari of particular selected pictures.

27. Apparatus according to claim 22 wherein said visual data recording comprises a plurality of successive picture segments each comprising a plurality of said different pictures of a given scene as viewed from different known aspect positions, said successive picture segments retaining pictures of scenes as viewed from known sequential aspect positions along given paths of movement, said control means comprises dynamic control means for sequentially selecting from each said pictured segment a particular pair of pictures of said scenes as viewed from aspect positions nearest sequential aspect positions along a simulated path of movement, and said projection means comprises dynamic projection means for sequentially projecting composite displays comprising superimposed images of the pictures selected in each picture segment.

28. Apparatus according to claim 27 wherein said projection means comprises mixing means for varying the relative contribution made to said composite displays by each picture in each of said selected pair of particular pictures.

29. Apparatus according to claim 28 wherein said control means comprises mixer control means for providing in said composite displays a given ratio of contribution by said selected pictures, said given ratio being dependent upon the relative separation between each of said sequential aspect positions and each of the aspect positions represented by the corresponding particular pair of selected pictures.

30. Apparatus according to claim 29 wherein said mixing means comprises a mixer plate positioned to receive on one surface the projected image of one of said selected particular pictures and on an opposite surface the projected image of said other selected particular picture, said mixer plate comprising a mixing portion that is partially light transmissive and partially light reflective, the light reflectiveness of said mixing portion varying relative to its light transmissiveness in a given direction along the surface of said plate, and said mixing means further comprises motive means for producing relative movement between said mixer plate and said projected images in said given direction.

31. Apparatus according to claim 30 wherein said mixer plate comprises a fully light transmissive portion and a fully light reflective portion straddling said mixing portion in said given direction, said fully transmissive and fully reflective portions having sufficient surface area to receive the entire projected images of said pair of particular selected pictures.

32. Apparatus according to claim 29 wherein pictures of said scene viewed from directly adjacent aspect positions are physically separated in each of said picture segments by pictures of said scene viewed from other aspect positions.

33. Apparatus according to claim 29 wherein said visual data recording comprises a plurality of physically separated picture sequences each including pictures in each of said picture segments, and pictures in each of said picture segments of said scene viewed from directly adjacent aspect positions are located in different ones of said plurality of physically separated picture sequences.

34. A method for visually simulating motion along a path, said method comprising the steps of:
   a. recording a plurality of picture sequences, each of said sequences representing approaches to a given point along different known paths, said known paths radiating from said point;
   b. selecting from said plurality of picture sequences another picture sequence simulating a different approach to said point along a path that crosses a plurality of said known paths,
   c. and projecting a display of said another picture sequence so as to visually simulate said different approach to said point.

35. A method as set forth in claim 34 wherein:
   a. said step of selecting includes the step of selecting from two picture sequences a pair of pictures which are nearest said different approach; and
   b. said step of projecting a display includes the step of projecting a composite display comprising the superposed images of said selected pair of pictures.

36. A method according to claim 35 including the step of selectively controlling the relative contribution made to said composite display by each picture of said selected pair.

37. A method according to claim 36 wherein said selective control step comprises providing for said composite display a ratio of relative contribution by said pictures dependent upon the relative separation between the two picture sequences and said different approach.

38. A method according to claim 35 wherein said recording step comprises recording a plurality of picture segments each including a plurality of pictures of a given scene as viewed from different known aspect positions, said pictures in successive picture segments representing views of scenes from sequential aspect positions along given paths of movement; said selecting step comprises sequentially selecting from each picture segment a pair of pictures of said scenes as viewed from aspect positions nearest sequential aspect positions along a simulated path of movement; and said projecting step comprises sequentially projecting composite displays comprising the superimposed images of said pair of pictures selected in each picture segment.

39. A method according to claim 38 including the steps of selectively controlling the relative contribution made to said composite displays by each of said pictures selected in each picture segment.

40. A method according to claim 39 wherein said selective control steps comprise providing for said composite displays a ratio of relative contribution by said selected pictures dependent upon the relative separation between the aspect positions they represent and the sequential aspect positions along said simulated path of movement.